US012715581B2

(12) United States Patent
Bennett

(10) Patent No.: US 12,715,581 B2
(45) Date of Patent: Aug. 25, 2026

(54) METHOD AND APPARATUS USED FOR BIOLOGICAL CONTROL OF AGRICULTURAL PESTS

(71) Applicant: Chandler Bennett, Salinas, CA (US)

(72) Inventor: Chandler Bennett, Salinas, CA (US)

( * ) Notice: Subject to any disclaimer, the term of this patent is extended or adjusted under 35 U.S.C. 154(b) by 239 days.

(21) Appl. No.: 18/476,721

(22) Filed: Sep. 28, 2023

(65) Prior Publication Data

US 2025/0010989 A1 Jan. 9, 2025

Related U.S. Application Data

(60) Continuation-in-part of application No. 17/351,092, filed on Jun. 17, 2021, now Pat. No. 12,091,174, and a continuation-in-part of application No. 17/351,102, filed on Jun. 17, 2021, now Pat. No. 11,952,118, said application No. 17/351,092 is a division of (Continued)

(51) Int. Cl.

| | |
|---|---|
| ***B64D 1/18*** | (2006.01) |
| ***A01C 17/00*** | (2006.01) |
| ***A01M 9/00*** | (2006.01) |
| ***B64C 39/02*** | (2023.01) |
| ***B64U 10/10*** | (2023.01) |
| ***B64U 10/25*** | (2023.01) |
| ***B64U 30/10*** | (2023.01) |
| ***B64U 30/20*** | (2023.01) |
| ***B64U 101/00*** | (2023.01) |

(52) U.S. Cl.

CPC .............. *B64D 1/18* (2013.01); *A01C 17/001* (2013.01); *A01C 17/003* (2013.01); *A01M 9/0061* (2013.01); *B64C 39/024* (2013.01); *B64U 10/10* (2023.01); *B64U 10/25* (2023.01); *B64U 30/10* (2023.01); *B64U 30/20* (2023.01); *B64U 2101/00* (2023.01); *B64U 2201/10* (2023.01)

(58) Field of Classification Search

CPC ....... B64D 1/18; A01C 17/001; A01C 17/003; A01M 9/0061

USPC .............................................................. 222/1

See application file for complete search history.

(56) References Cited

U.S. PATENT DOCUMENTS 2,765,194 A * 10/1956 Will .................... A01M 1/2055 239/59

3,532,276 A * 10/1970 Dunn ........................ B07B 1/18 209/23

(Continued)

FOREIGN PATENT DOCUMENTS

AU 2022202509 A1 11/2022

*Primary Examiner* — David P Angwin

(74) *Attorney, Agent, or Firm* — Knowmad Law; Christopher R. McElwain

(57) ABSTRACT

An apparatus for biological control of agricultural pests and for reducing damage to crops is disclosed. The apparatus includes a rotatable container for holding biological organisms or material. The walls of the container include a series of openings through which the biological organisms or material can pass, dispersing the biological organisms or material over a target area when the container is rotated. An improved embodiment of the apparatus further includes a sleeve around the container for controlling the dispersion rate. The sleeve includes a second series of openings which, when aligned or partially aligned with the container openings, form gaps of variable size and shape through which the biological organisms or material can pass.

18 Claims, 39 Drawing Sheets

Related U.S. Application Data application No. 16/074,756, filed as application No. PCT/US2016/068101 on Dec. 21, 2016, now Pat. No. 11,066,167, said application No. 17/351,102 is a division of application No. 16/074,756, filed as application No. PCT/US2016/068101 on Dec. 21, 2016, now Pat. No. 11,066,167.

(60) Provisional application No. 62/290,345, filed on Feb. 2, 2016.

(56) References Cited

U.S. PATENT DOCUMENTS 3,734,417 A * 5/1973 Russell .................. A47J 42/38 241/168
3,738,579 A * 6/1973 Bretz ...................... A01C 3/04 239/651
3,890,129 A 6/1975 Chester
4,106,643 A * 8/1978 McGehee ............. B65G 65/42 414/528
4,162,752 A * 7/1979 Satterfield ................ B07B 1/24 222/616
4,260,108 A 4/1981 Maedgan
4,262,846 A 4/1981 Funkhouser
4,347,951 A 9/1982 Wood
4,453,675 A 6/1984 Kodadek
4,569,281 A * 2/1986 Woods ................... B30B 9/321 100/103
4,702,129 A * 10/1987 Allen ....................... B67B 7/18 81/3.4
4,718,363 A 1/1988 Williames
5,027,725 A * 7/1991 Keeton ................... A01C 7/04 111/184
5,351,382 A * 10/1994 Merrick ............. B25B 13/5075 29/426.1
5,605,834 A 2/1997 Eberthson
7,320,254 B1 * 1/2008 Martin ................... B67B 3/261 73/862.21
9,382,003 B2 7/2016 Burema
10,251,514 B2 * 4/2019 Ding ...................... A47J 42/50
10,377,491 B1 8/2019 Fine
2003/0052207 A1 * 3/2003 Wu ........................ A47J 42/46 241/169.1
2005/0274832 A1 * 12/2005 Bowsher ............. A01C 17/001 239/685
2005/0279850 A1 * 12/2005 Stabler .................... A01C 3/06 239/689
2006/0101788 A1 * 5/2006 Graffin ................. B67B 3/2033 53/317
2006/0113425 A1 * 6/2006 Rader .................... B64C 17/00 244/17.11
2009/0051310 A1 2/2009 Chandhoke
2013/0186988 A1 * 7/2013 Dube .................. A01C 17/003 239/672
2014/0263764 A1 * 9/2014 Outcalt ................ E01H 10/007 239/687
2015/0225905 A1 * 8/2015 Gareis ...................... B25F 3/00 81/469
2015/0356237 A1 12/2015 Saito
2016/0114714 A1 * 4/2016 Hazelton ............. A01C 15/122 414/528
2016/0307448 A1 10/2016 Salnikov
2018/0106382 A1 * 4/2018 Dubiel .................. A01C 15/02
2018/0352726 A1 * 12/2018 Chini .................. A01C 17/003
2020/0288627 A1 9/2020 Feiner
2022/0201929 A1 * 6/2022 Ohlsen .................... B64D 1/16

* cited by examiner

METHOD AND APPARATUS USED FOR BIOLOGICAL CONTROL OF AGRICULTURAL PESTS

PRIORITY CLAIM

This non-provisional application is a continuation-in-part, claiming priority to co-pending U.S. Utility application Ser. No. 17/351,092, entitled "Method and Apparatus used for Biological Control of Agricultural Pests," filed Jun. 17, 2021 and co-pending U.S. Utility application Ser. No. 17/351,102, entitled "Method and Apparatus used for Biological Control of Agricultural Pests," filed Jun. 17, 2021, and is entitled to the benefit of, and claims priority to U.S. Utility patent application Ser. No. 16/074,756, entitled "Method and Apparatus used for Biological Control of Agricultural Pests," filed Aug. 1, 2018, and Provisional Patent Application Ser. No. 62/290,345, entitled "Method and Apparatus for Biological Control of Agricultural Pests," filed on Feb. 2, 2016; all of which are included by reference as fully set forth herein.

TECHNICAL FIELD

The present invention relates generally to the field of biological control of agricultural pests, and more specifically without limitation, to a spider mite biological control method and apparatus thereof.

BACKGROUND OF THE INVENTION

Plant pests are a significant factor in the loss of the world's important agricultural crops. Billions of dollars are lost every year in the U.S. and around the world due to infestations of plants by non-mammalian pests including insects. In addition to losses in field crops, insect pests and/or mites are also a burden to vegetable and fruit growers, to producers of ornamental flowers, and to home gardeners. For example, spider mites often attack strawberry fields causing extensive damage to the crop, resulting in significant economic loss to the growers.

Insect pests and/or mites are mainly controlled by intensive applications of chemical pesticides and/or insecticides, which are active through inhibition of insect growth, prevention of insect feeding or reproduction, or cause death. Although the use of such chemicals can result in good control of insect pests, the widespread use of chemical pesticides can result in the appearance of resistant insect varieties. Moreover, high levels of chemicals on horticultural crops are undesirable to many consumers. Further, chemical pesticides can also encourage the spread of the insect pests such as spider mites by killing the beneficial insects that prey on them. Similarly, insect pests or mites are also known to develop quick resistance to various pesticides.

An alternative to using chemical pesticides and/or insecticides is through the application of beneficial insects or mites. The beneficial insects or mites used are advantageously predatory towards pest insects such as two-spotted spider mites and can be applied to crops to control insect pests. Beneficial insects or mites can be dispersed on crop plants in a variety of ways, for example manually or through a controlled release device.

The use of beneficial insects or mite forms part of integrated crop management and integrated pest management programs, combining cultural, biological and chemical means to achieve sustainable pest control. However, a typical problem currently encountered with the release of beneficial insects, predatory mites or other essentially beneficial biological organisms in agricultural fields is that it can be very labor intensive and inaccurate. For instance, hand application is not precise in placement of hots spots and application amounts can vary significantly over a given area.

The application of biologicals by hand is not only labor intensive but poses other problems which result in a higher cost of application of the biologicals. For example, the high cost comes from not only time and related hourly wages but also from insurance, workman's compensation, and other costs associated with manual labor. In addition, hand application of biologicals requires workers to walk through the growing fields which can introduce the problem of stepping on the crops causing damage thereof. Further, using tractors or the like for application of biologicals over and/or on crops may not be practical or even an option in rainy or muddy conditions which delays important treatment of agricultural pests.

In light of the shortcomings in the prior art, there clearly exists a need for the application of materials and/or biological organisms such as beneficial insects or predatory mites using aerial vehicles, specifically unmanned aerial vehicles, for the rapid dispersal of the biological organisms/materials over large or concentrated areas with minimal manual labor.

SUMMARY OF THE INVENTION

The present invention is an apparatus used for biological control and/or eradication of agricultural pests (e.g., prey) by the spreading of essentially beneficial biological organisms and/or materials over a selected target location for reducing damage to crops.

The present invention is also directed to an apparatus and method for dispensing essentially beneficial biological organisms such as predatory mites over a selected biological target or target location such as a strawberry field in order to control and/or to eradicate spider mites (e.g., prey).

It is a feature of the present invention to provide an apparatus for biological control of agricultural pests comprised of a container for containing biological organisms or materials and having a dispensing port; said dispensing port for dispensing the biological organisms or materials on a target location or biological target to be treated; an auger motor mounted within the container; an auger driven by the auger motor and having a plurality of spiral like wire brushes for urging the biological organisms to the dispensing port; a spreader motor disposed within the container and disposed substantially at the dispensing port of the container; and a spreader agitating device driven by the spreader motor for spreading the biological organisms or materials over the target location or biological target to be treated.

It is a further feature of the present invention to provide an autonomous airborne apparatus used for biological control of agricultural pests comprised of a container for containing biological organisms or materials and having a dispensing port; said dispensing port for dispensing the biological organisms or materials on a target location to be treated; and a motor for driving the biological organisms or materials out of the container through the dispensing port.

In an alternative embodiment of the present invention, the apparatus used for biological control of agricultural pests comprises a dispersion unit for dispersing biological organisms or materials on a target location. The dispersion unit comprises a rotatable container, such as a cylindrical drum, for containing the biological organisms or materials. A motor rotates the container, and the resulting centrifugal force urges the biological organisms or materials through a series of openings in the walls of the container.

This dispersion unit may be improved by a sleeve wrapped around the container. The sleeve includes a second series of openings, which may be aligned, unaligned, and/or partially aligned with the openings of the container. The sleeve openings and container openings form gaps when aligned or partially aligned, through which the biological organisms or materials can pass during operation of the apparatus. This feature thus allows modification of the size, shape, and/or quantity of openings through which the biological organisms or materials pass, facilitating control of the dispersion rate.

Another advantageous feature of the invention is to provide a method of biologically controlling agricultural pests, the method comprising the steps of containing biological organisms or materials within a container having a dispensing port; driving an auger having a plurality of spiral like wire brushes for urging the biological organisms or materials to the dispensing port using the spiral like wire brushes; dispensing the biological organisms or materials through the dispensing port; agitating the biological organisms received from the dispensing port; and spreading the agitated biological organisms or materials over a target location or biological target to be treated.

The present invention additionally provides an apparatus to help reduce the need for manual labor when dispensing essentially beneficial biological organisms or materials such as predatory mites over biological targets such as agricultural crops.

The present invention also provides an apparatus for dispersing essentially beneficial biological organisms in a rapid manner over large or concentrated areas with minimal labor and time.

The present invention further provides an apparatus that can advantageously dispense essentially beneficial biological organisms or materials over large or concentrated areas using an unmanned aerial vehicle (UAV) (e.g., multi or single helicopter) such as a drone or a fixed wing UAV. Importantly, the use of UAVs helps to eliminate workers from potentially stepping on the crops and causing damage thereof. Likewise, the use of UAVs helps to advantageously eliminate the need of having to use tractors or similar like vehicles for the application of biologicals especially during rainy or muddy type weather conditions. Alternatively, the apparatus may be coupled to a manned or unmanned ground vehicle, such as a tractor or rover.

Another aspect of the present invention is to provide a low cost, high efficiency apparatus that can optionally use the aid or guidance of a global positioning system (GPS) on the UAV to uniformly apply the essentially beneficial biological organisms or materials over a selected biological target or target location such as strawberry fields or a structure.

A further aspect of the current invention is to provide an apparatus and method that can save agricultural growers a significant amount of money by helping them to control and/or to eliminate damage to their crops from plant pests.

An additional aspect of the present invention is to provide an apparatus and method that can help to reduce the amount of chemical pesticides and/or insecticides used to control and/or to eliminate agricultural pests.

The present invention also provides an apparatus and method for advantageously dispensing predatory mites, predatory insects, essentially beneficial biological organisms or beneficial biological materials over a selected biological target that is less harmful to humans.

Another feature of the invention is to provide an apparatus and method for advantageously dispensing various materials such as seeds, herbicides, pesticides, fungicides, fertilizers over a selected target or target location.

Consequently, for a better understanding of the present invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

Figure 1:
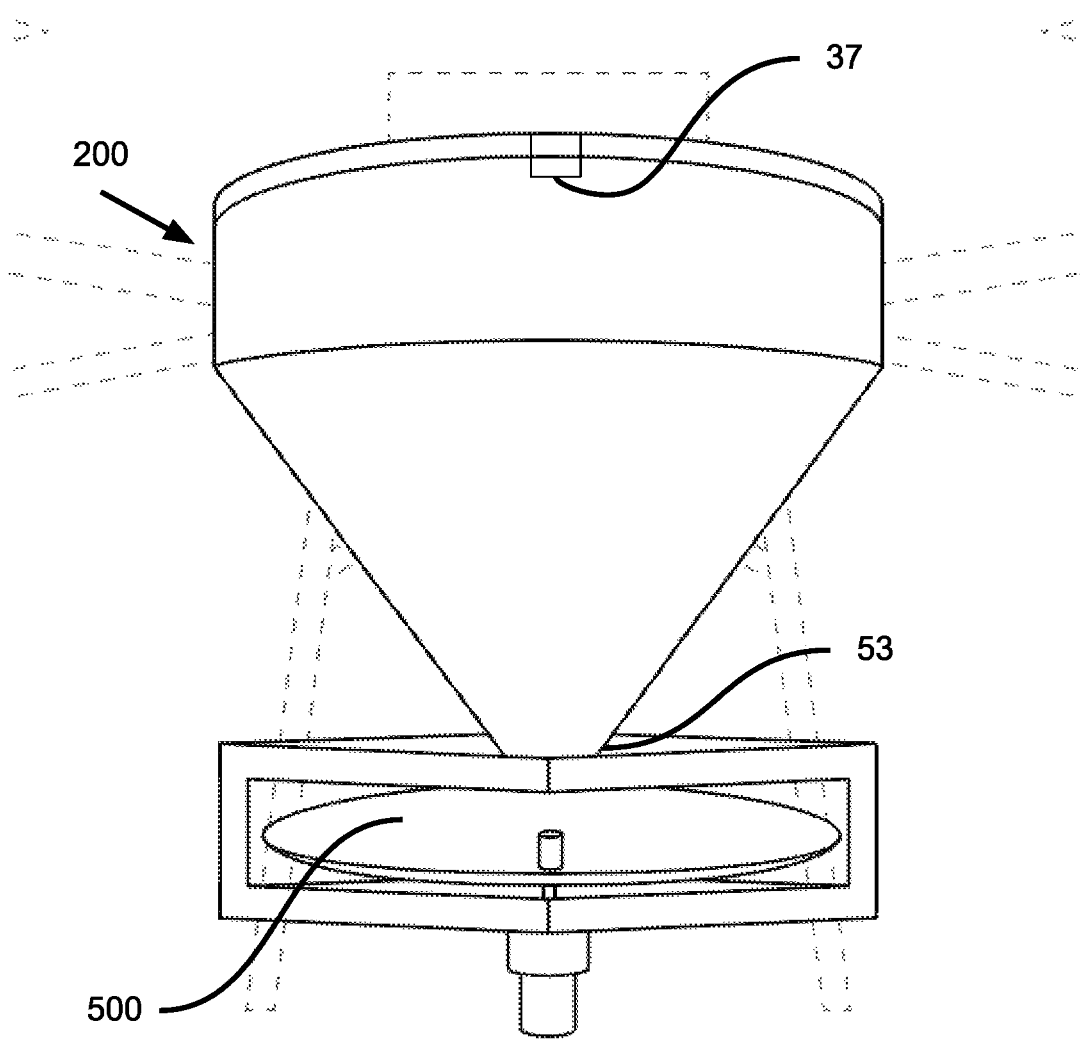
FIG. 1 is a front perspective view of the apparatus.
Figure 1A:
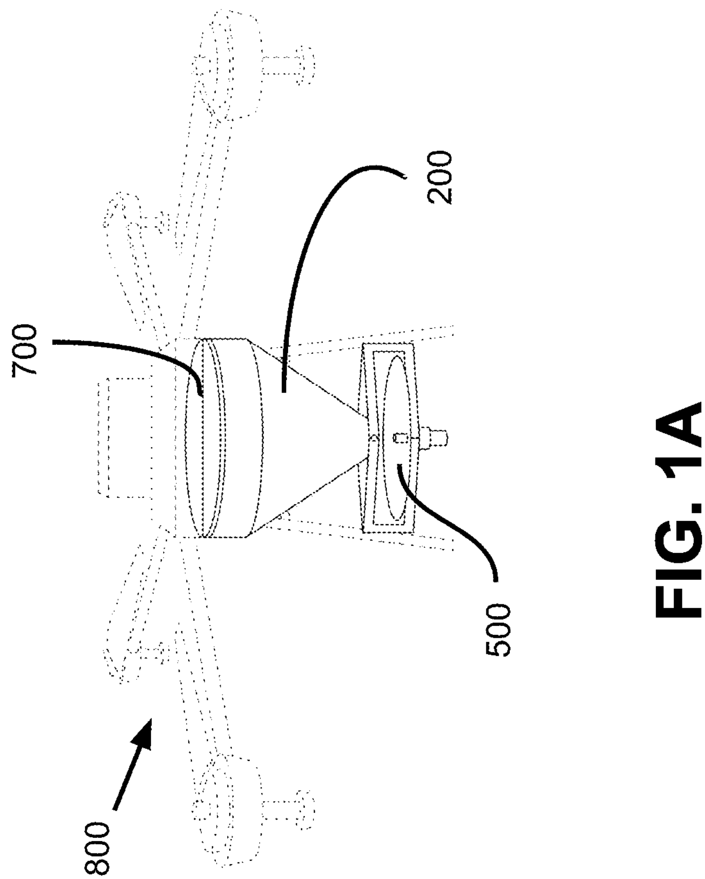
FIG. 1A is a front perspective view of the apparatus used to dispense beneficial biological organisms or materials over a target location when attached to a UAV.
Figure 1B:
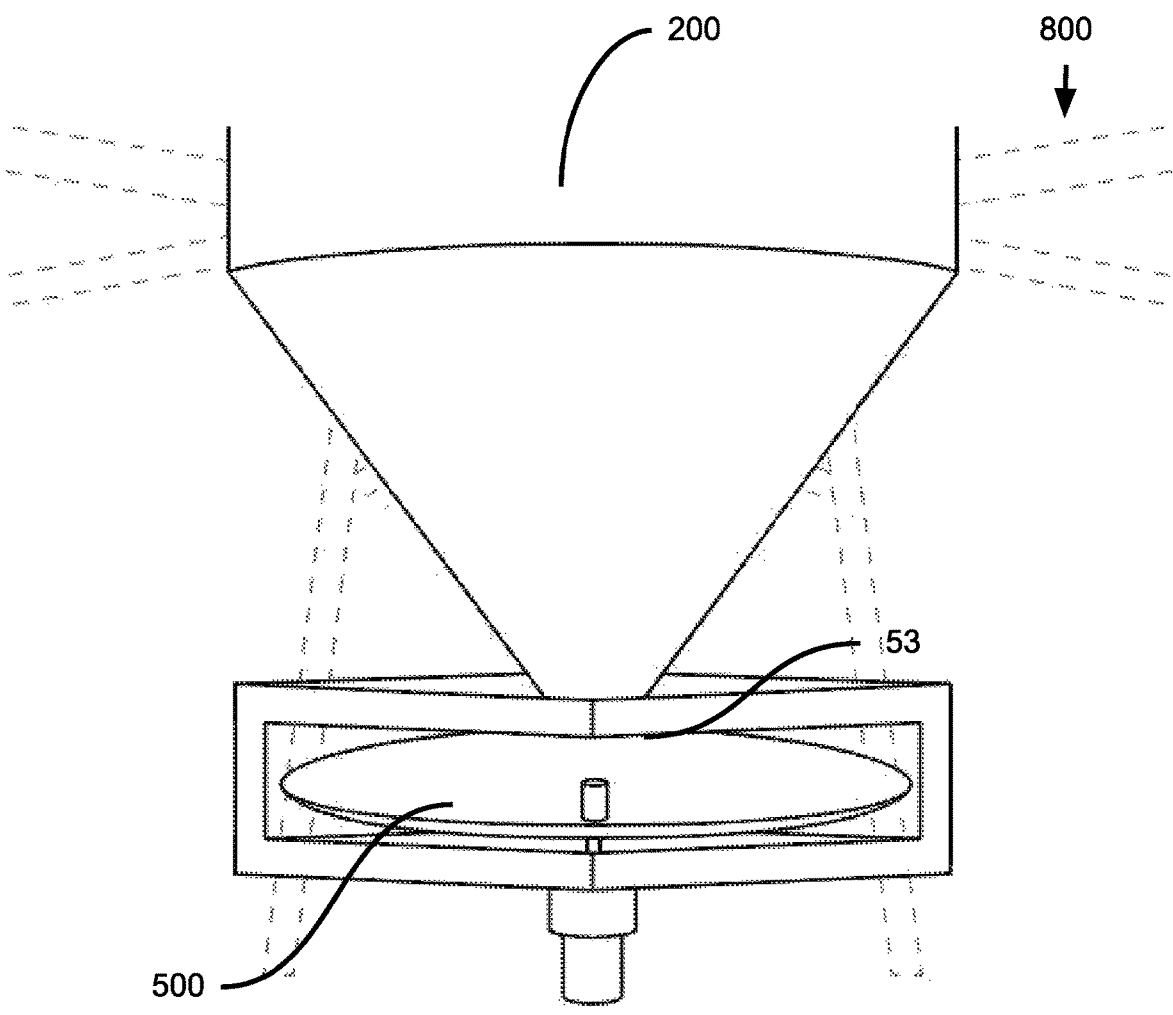
FIG. 1B is a partial front perspective view of the apparatus.

With reference to FIGS. 1, 1A and 1B, an apparatus 100 used for biologically controlling agricultural pests is shown that can be securely attached to an optional unmanned aerial vehicle (UAV) 800 as illustrated in FIGS. 1A, 13A, 13B, and 20. In use, the apparatus 100 can advantageously spread essentially beneficial biological organisms 7 or materials 9 over a selected biological target or target location such as agricultural crops in order to reduce damage caused by the agricultural pests. An example of agricultural pests or organisms known to cause damage to agricultural crops, but not limited to, is mites such as spider mites and insects.

Figure 2:
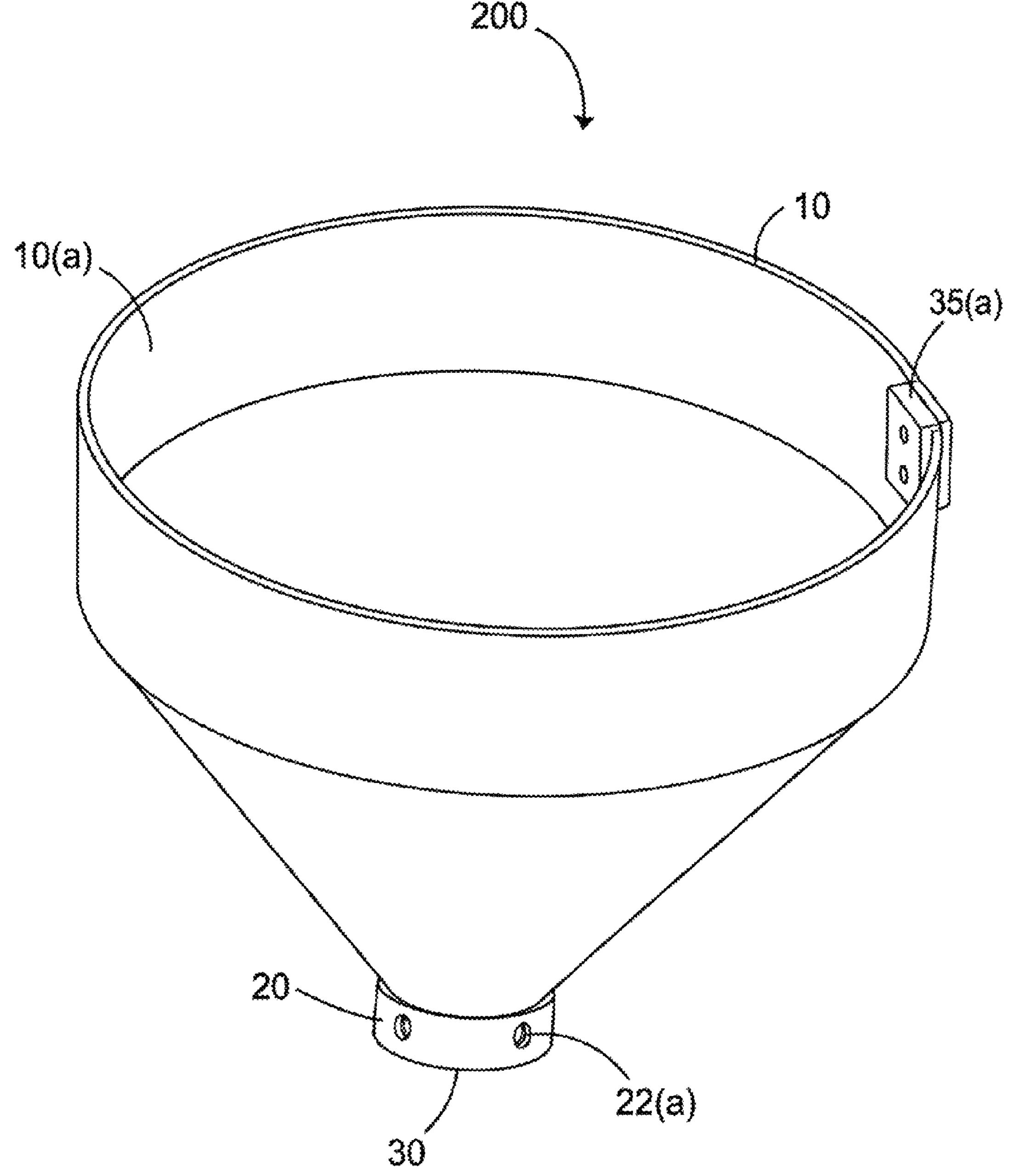
FIG. 2 is a front perspective view of the hopper.
Figure 2A:
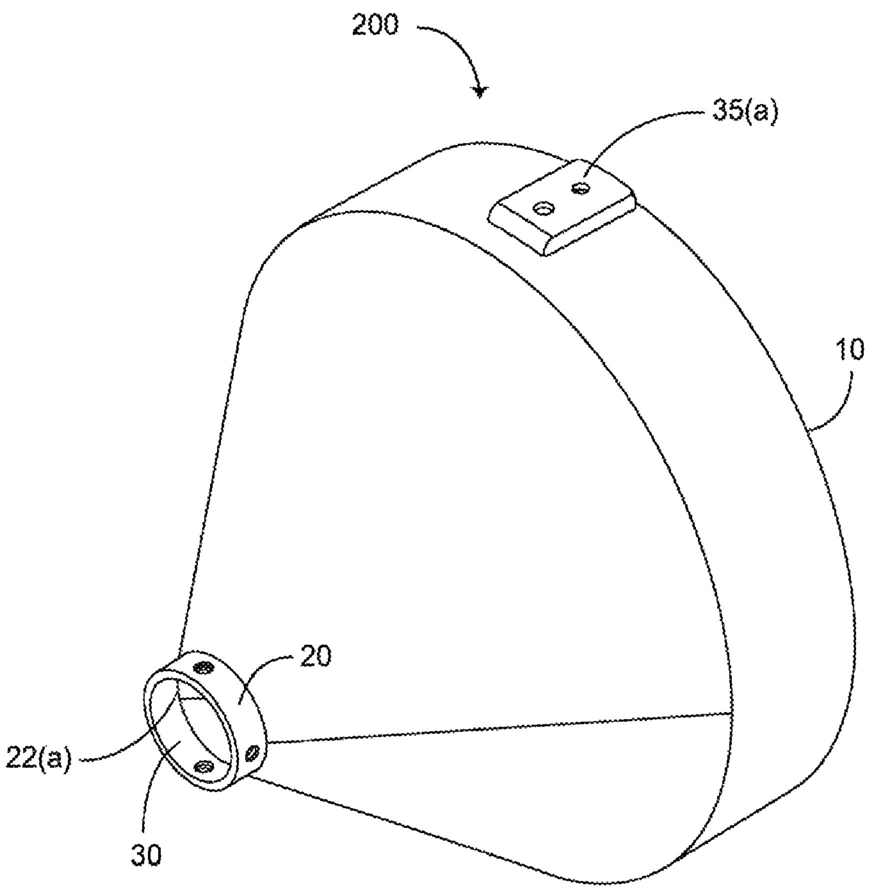
FIG. 2A is a side perspective view of the hopper.
Figure 2B:
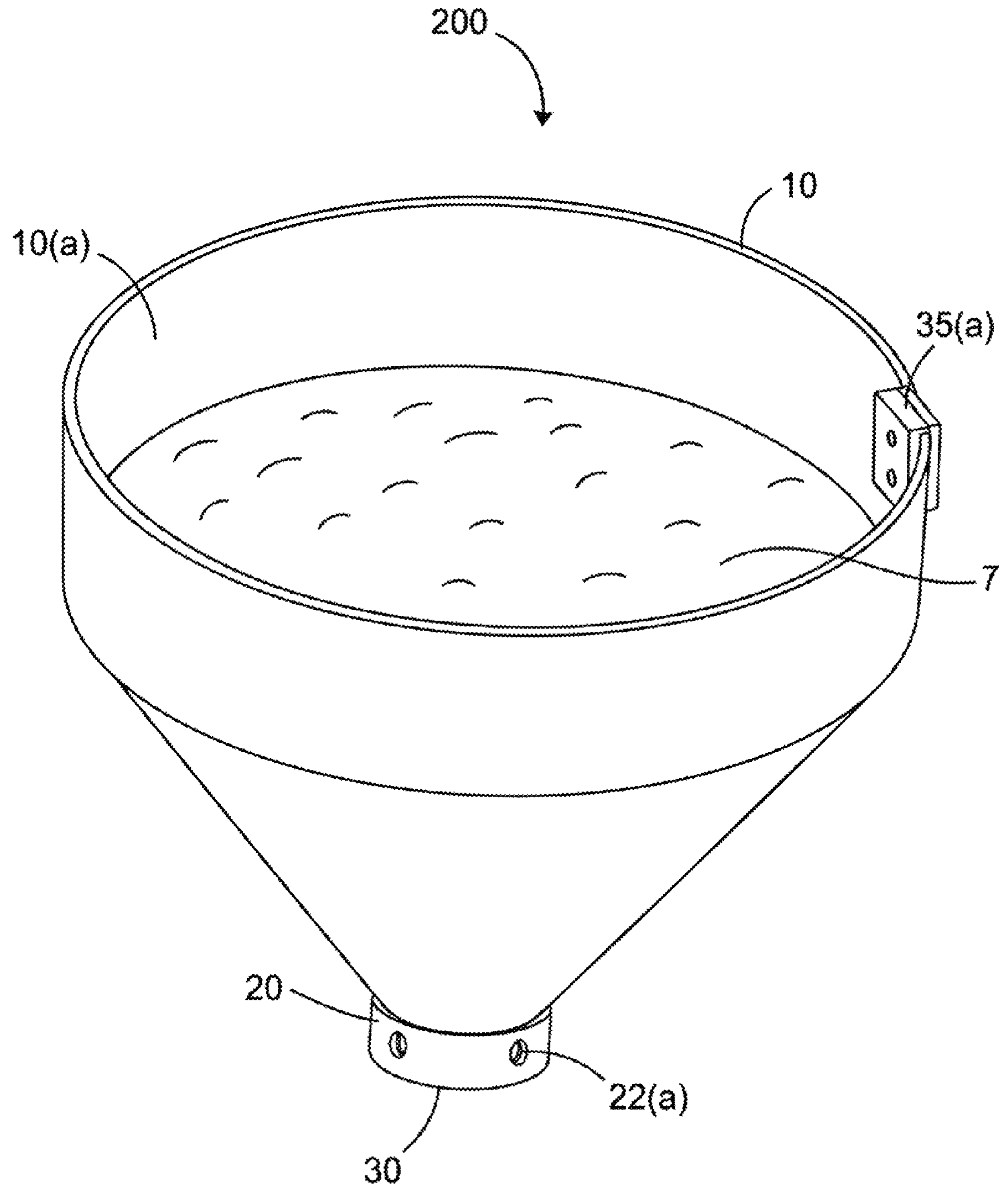
FIG. 2B is a front perspective view of the hopper holding biological organisms.
Figure 2C:
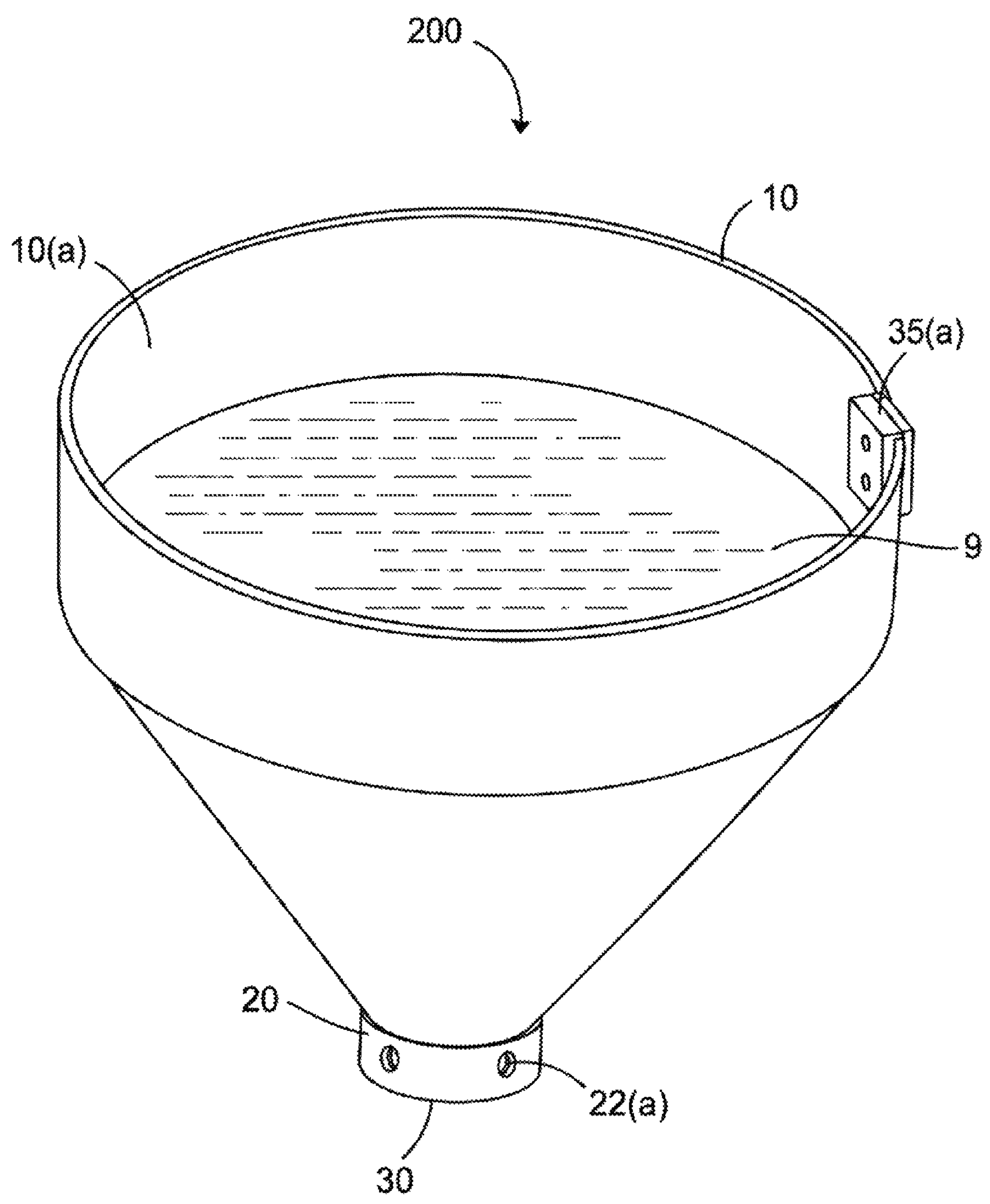
FIG. 2C is a front perspective view of the hopper holding biological materials.

As shown in FIGS. 2, 2A, and 2C, the apparatus 100 includes a container 200 (also referred to as hopper 200) that holds the essentially beneficial biological organisms 7 or materials 9 that are used to control and/or eradicate agricultural pests. The hopper 200 also includes first 10 and second 20 ends and an opening 10 at the first end 10 of the hopper 200 for insertion of the beneficial organisms 7. In addition, the hopper 200 includes a dispenser port 30 located substantially at the second end 20 of the hopper 200 for dispensing the beneficial organism or materials on a biological target or target location to be treated. For example, the hopper 200 could contain predatory mites such as the *Phytoseiulus persimilis* that feed on spider mites and their eggs. Also, existing systems include predatory mites being enclosed loosely in the hopper 200 or mixed with vermiculite for enhancing the suitability of their environment. Additionally, the hopper or any other container can accommodate various other carriers in conjunction with the biological organisms or materials 9. For example, the hopper 200 could contain a mixture of the predatory mites mixed with sawdust or the like or even mixed with both sawdust and vermiculite in order to enhance their environment. Referring still to FIGS. 2 and 2A, the hopper 200 further includes spinner motor screw holes 22*a* which will be aligned with the spinner motor mount screw holes 22*b* (See FIGS. 6 and 6B) when the spinner motor mount connection area 45 (See FIGS. 6 and 6B) is securely connected to the second end 20 of the hopper 200. The hopper 200 will also have mounting screw holes 35*a* which will be aligned with the auger motor mount screw holes 35 (See FIGS. 3 and 3A) for securing the auger motor mount 300 to the hopper 200. The auger motor mount will 300 (See FIGS. 3 and 3A) will be mounted to an auger motor mount area 10*a* that is located within the hopper 200 as shown in FIG. 2.

Figure 3:
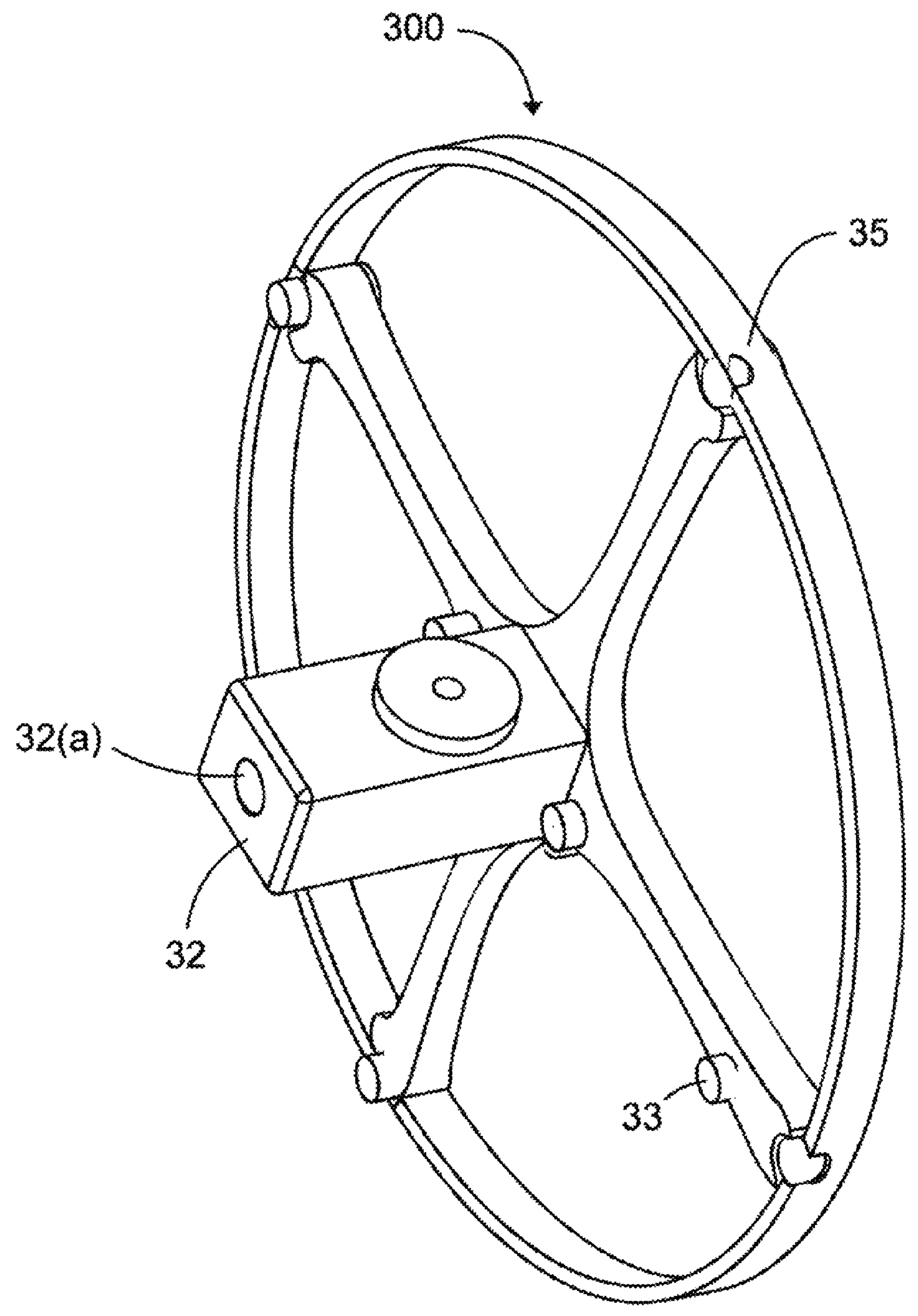
FIG. 3 is a side perspective view of the auger motor mount.
Figure 3A:
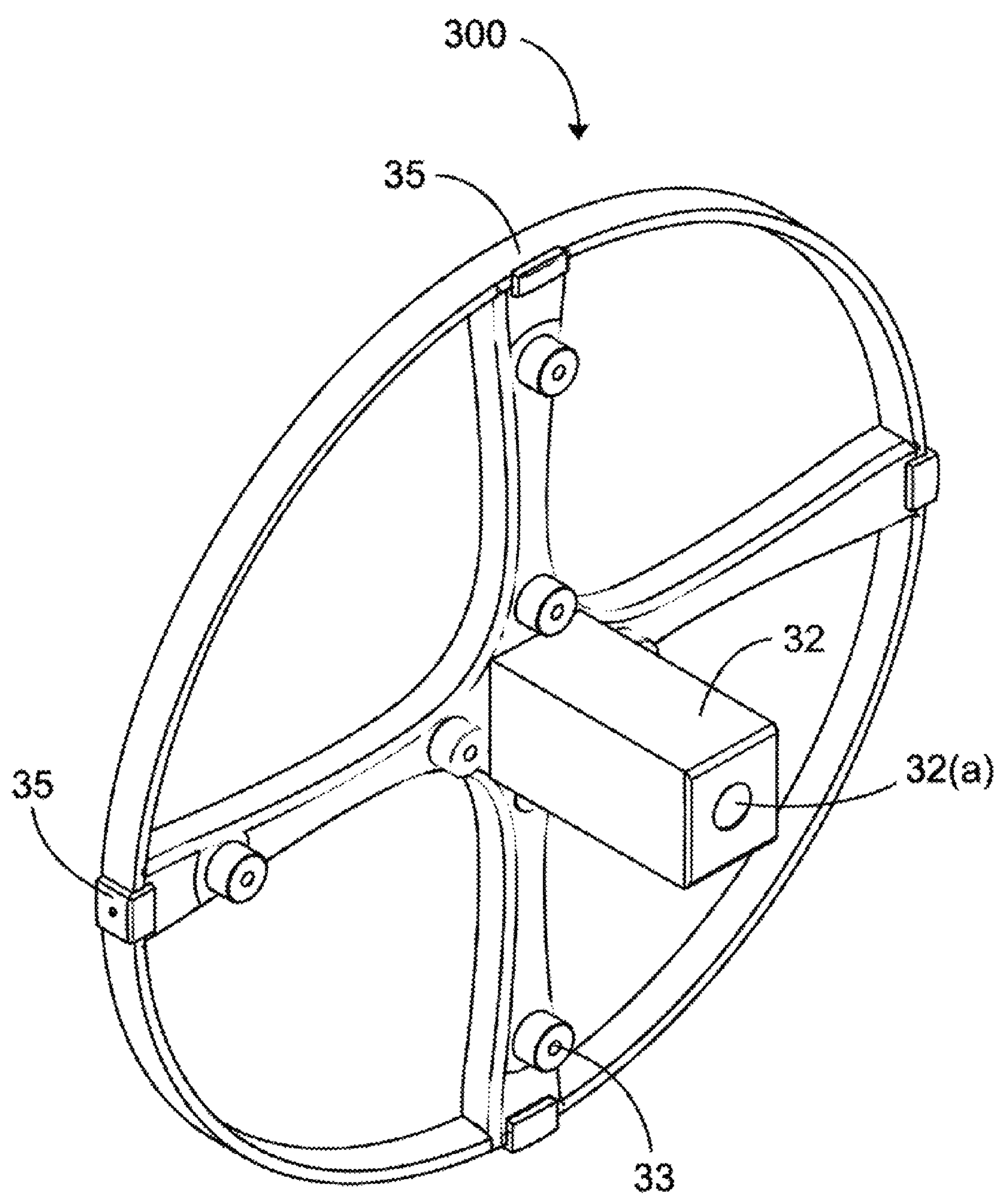
FIG. 3A is a front perspective view of the auger motor mount.

In FIGS. 3 and 3A, an auger motor mount 300 is shown which will be mounted within the hopper 200 as previously described above. The motor mount 300 will have fastening insert holes

33 for allowing an optional lid 700 to be mounted to the motor mount 300 when it is inserted in the hopper 200 and screws inserted into the screw insert slots 33*a* located on the lid 700. Moreover, the auger motor mount 300 will also have auger motor mount screw holes 35 (See FIGS. 3 and 3A) which will be aligned with the mounting screw holes 35*a* for securing the auger motor mount 300 to the hopper 200.

Figure 4:
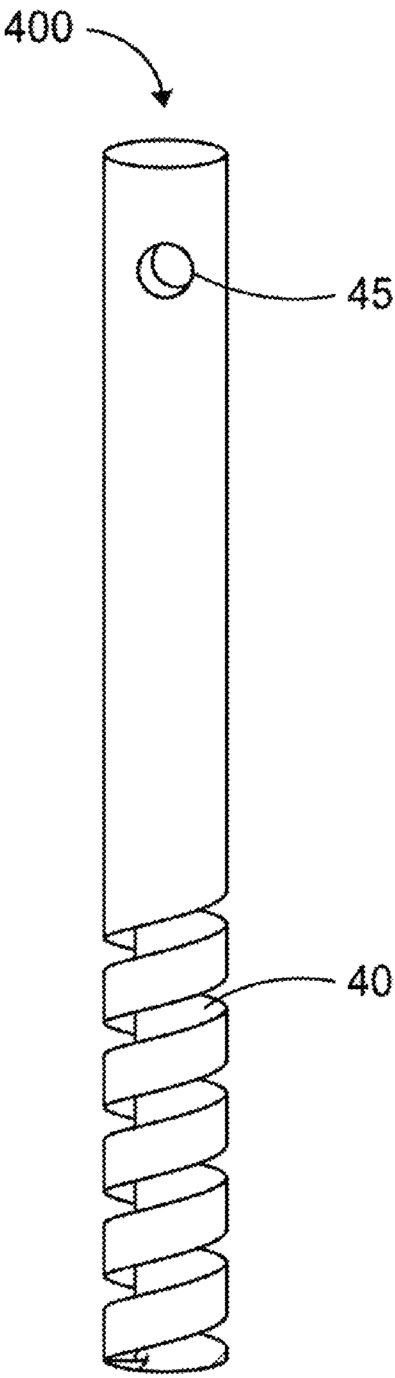
FIG. 4 is a front perspective view of the auger.
Figure 4A:
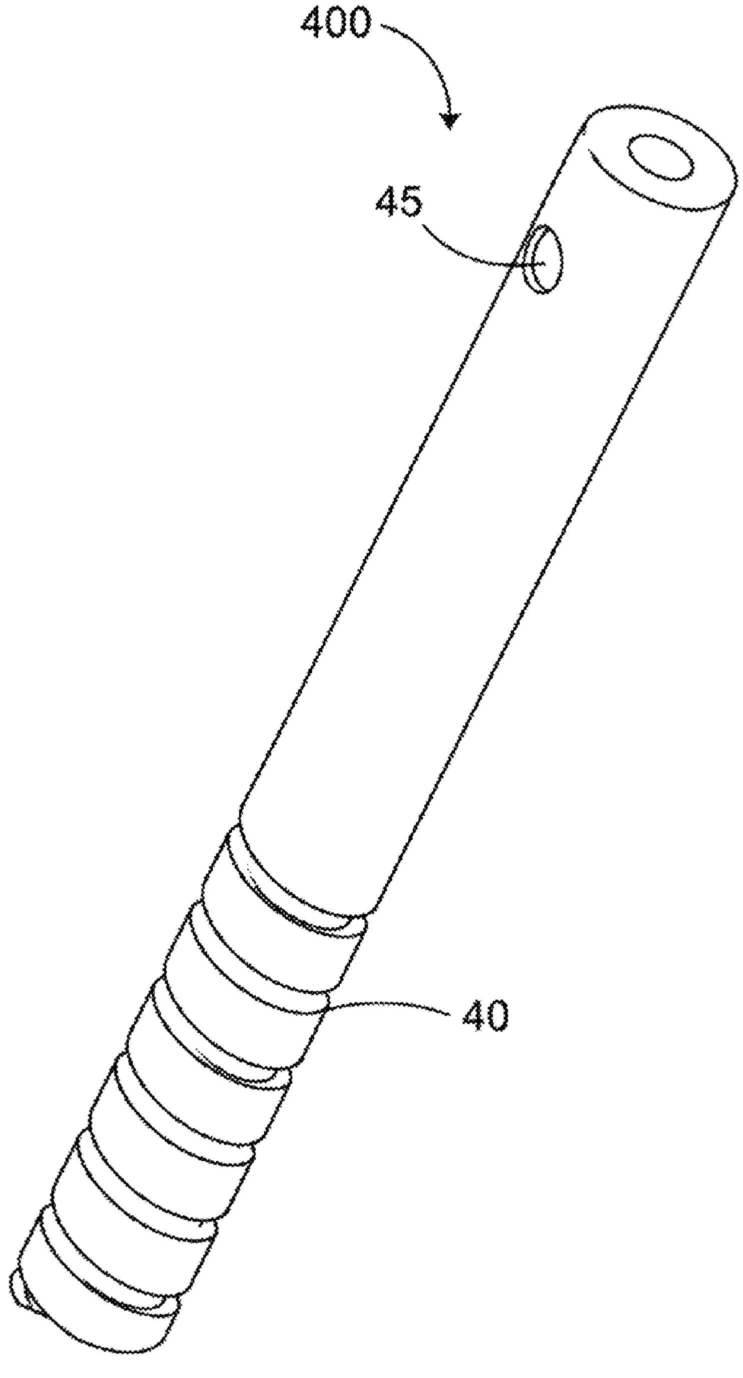
FIG. 4A is another front perspective view of the auger.
Figure 4B:
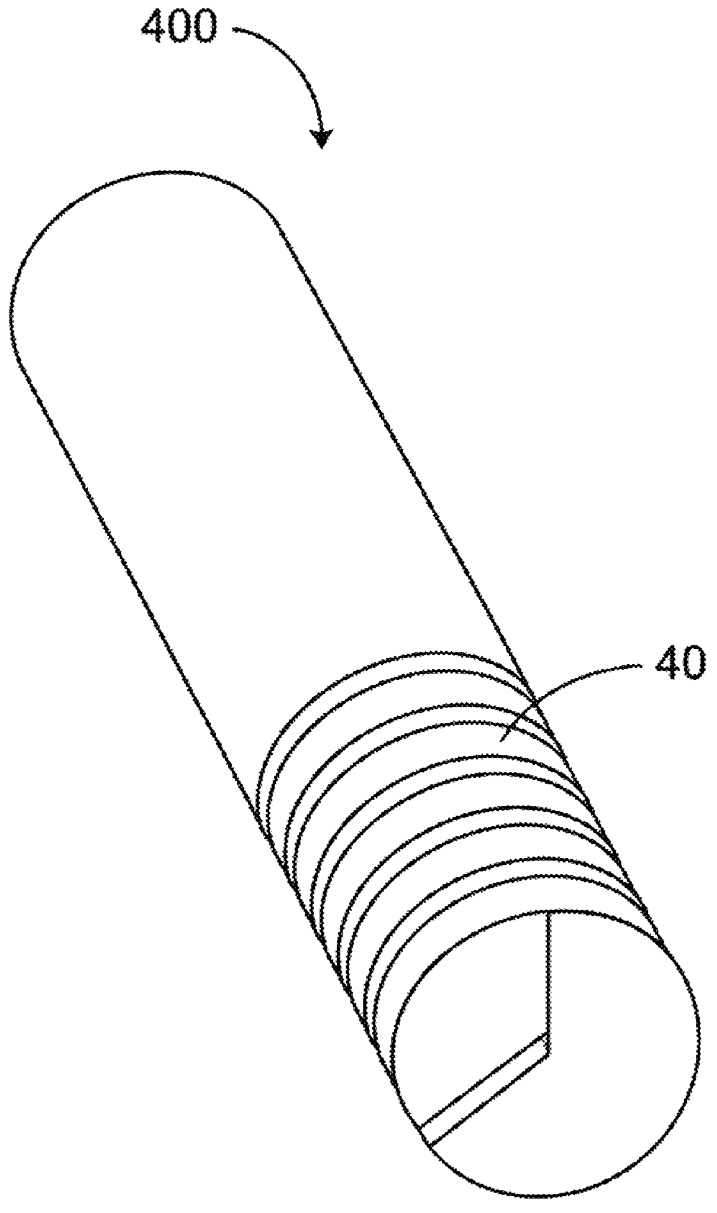
FIG. 4B is a further front perspective view of the auger.
Figure 4C:
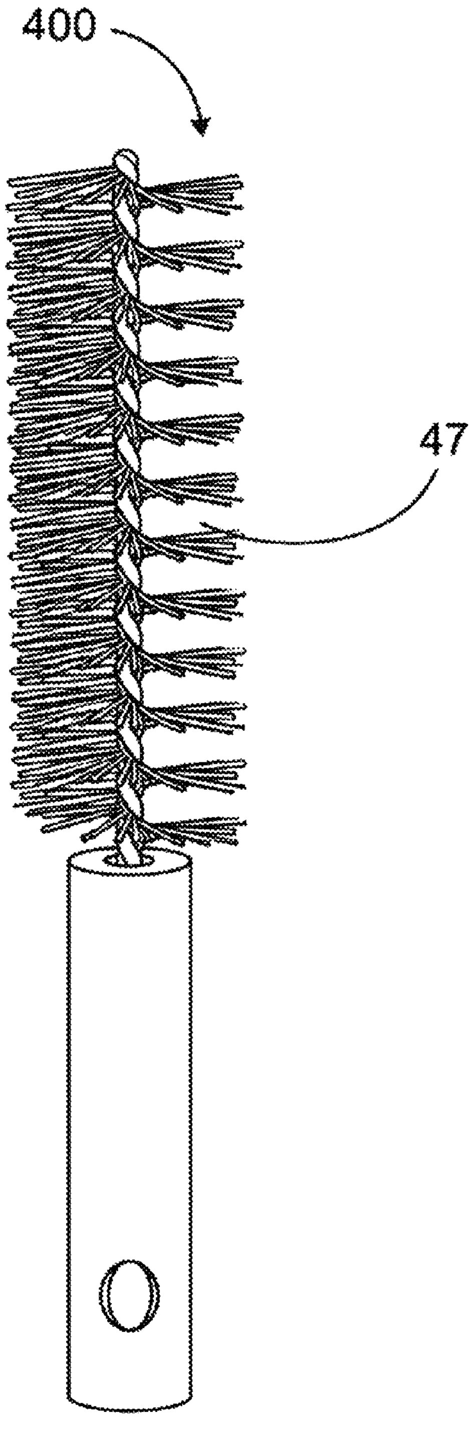
FIG. 4C is a front perspective view of the auger having a plurality of wire brushes.
Figure 4D:
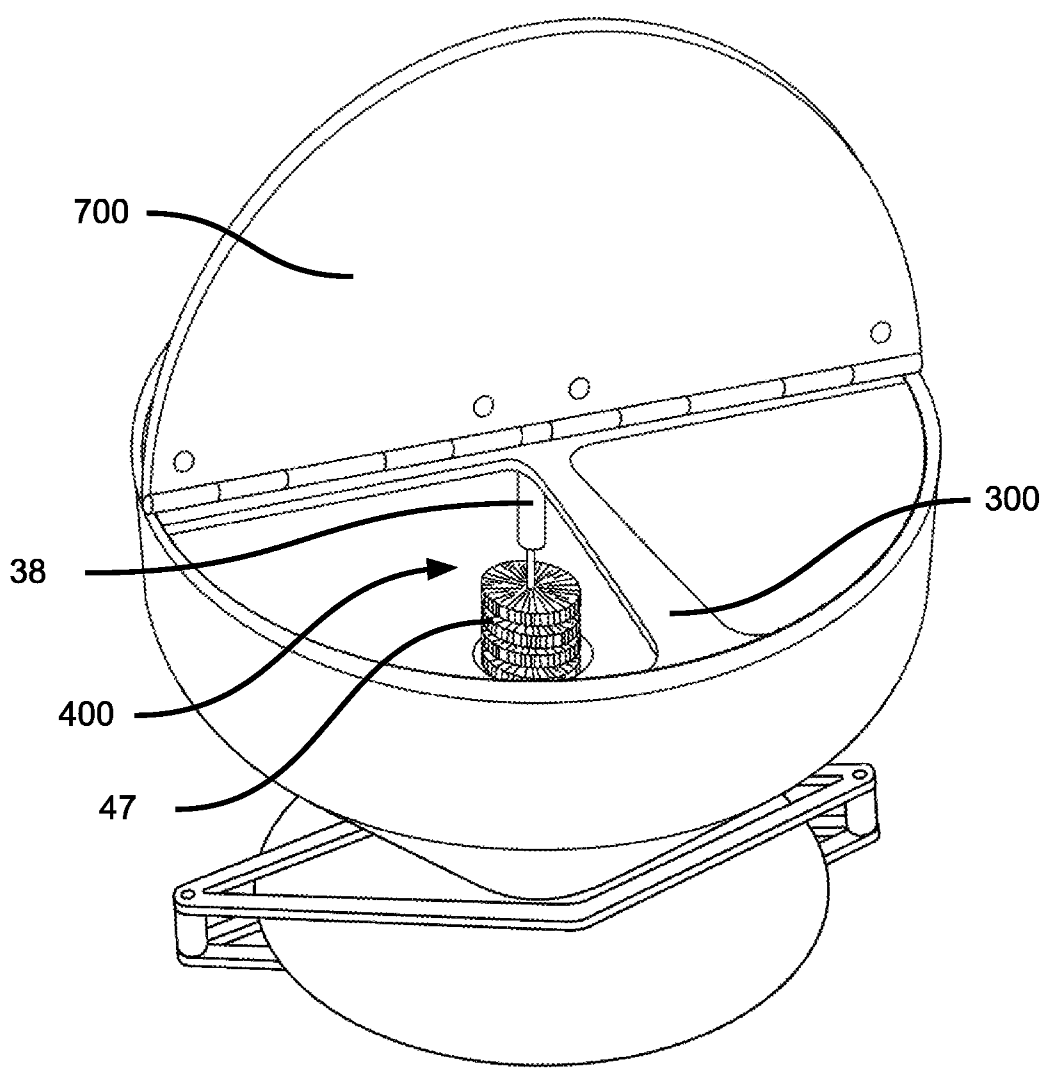
FIG. 4D is a partial top perspective view of the auger having a plurality of wire brushes.
Figure 12:
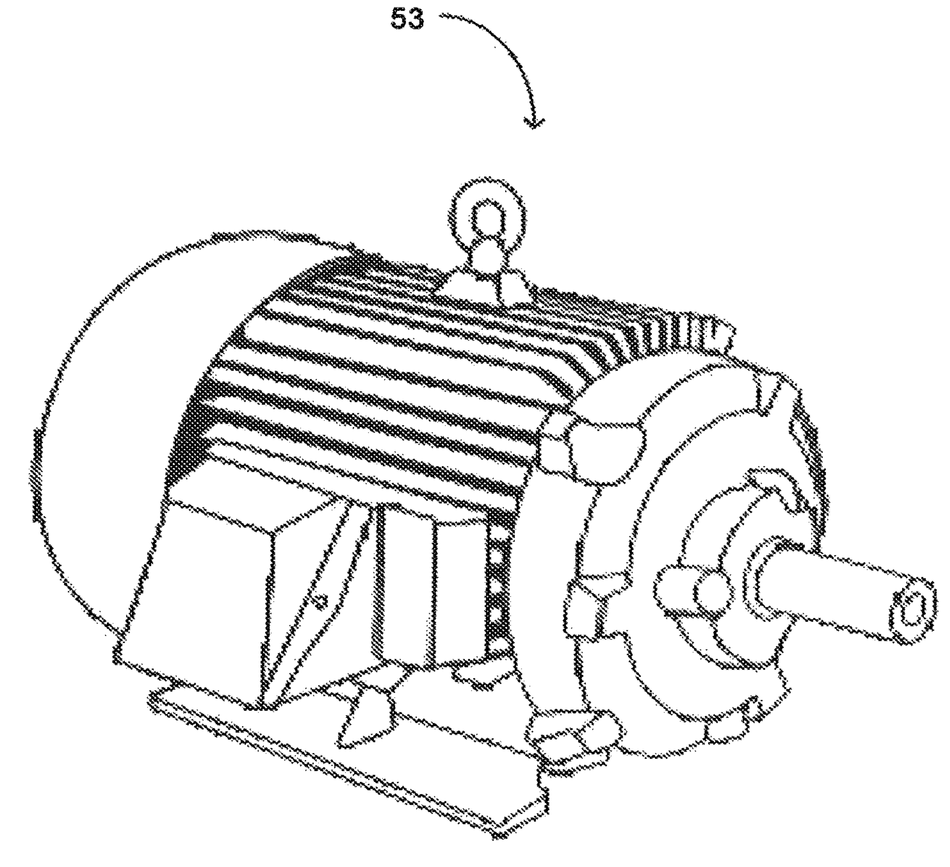
FIG. 12 is a front perspective view of the motor for the spreader agitating device.
Figure 12A:
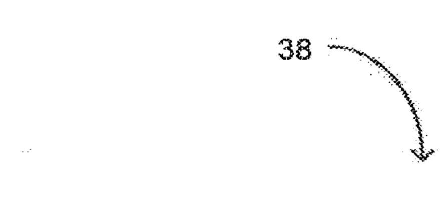
FIG. 12A is a front perspective view of the motor for the auger.
Figure 12A:
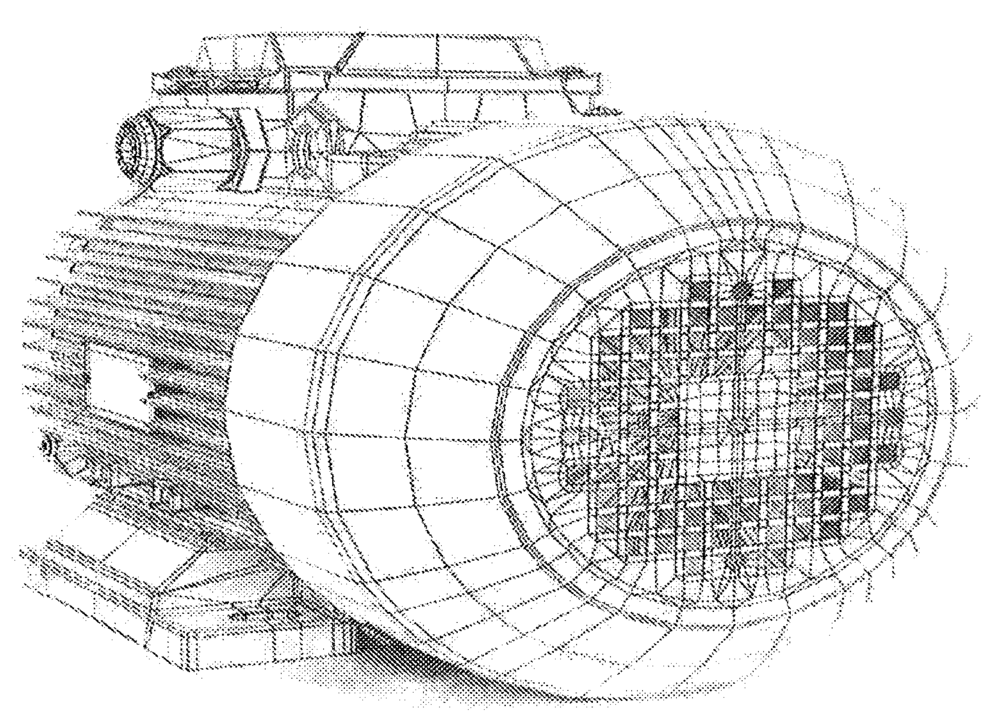
Figure 13A:
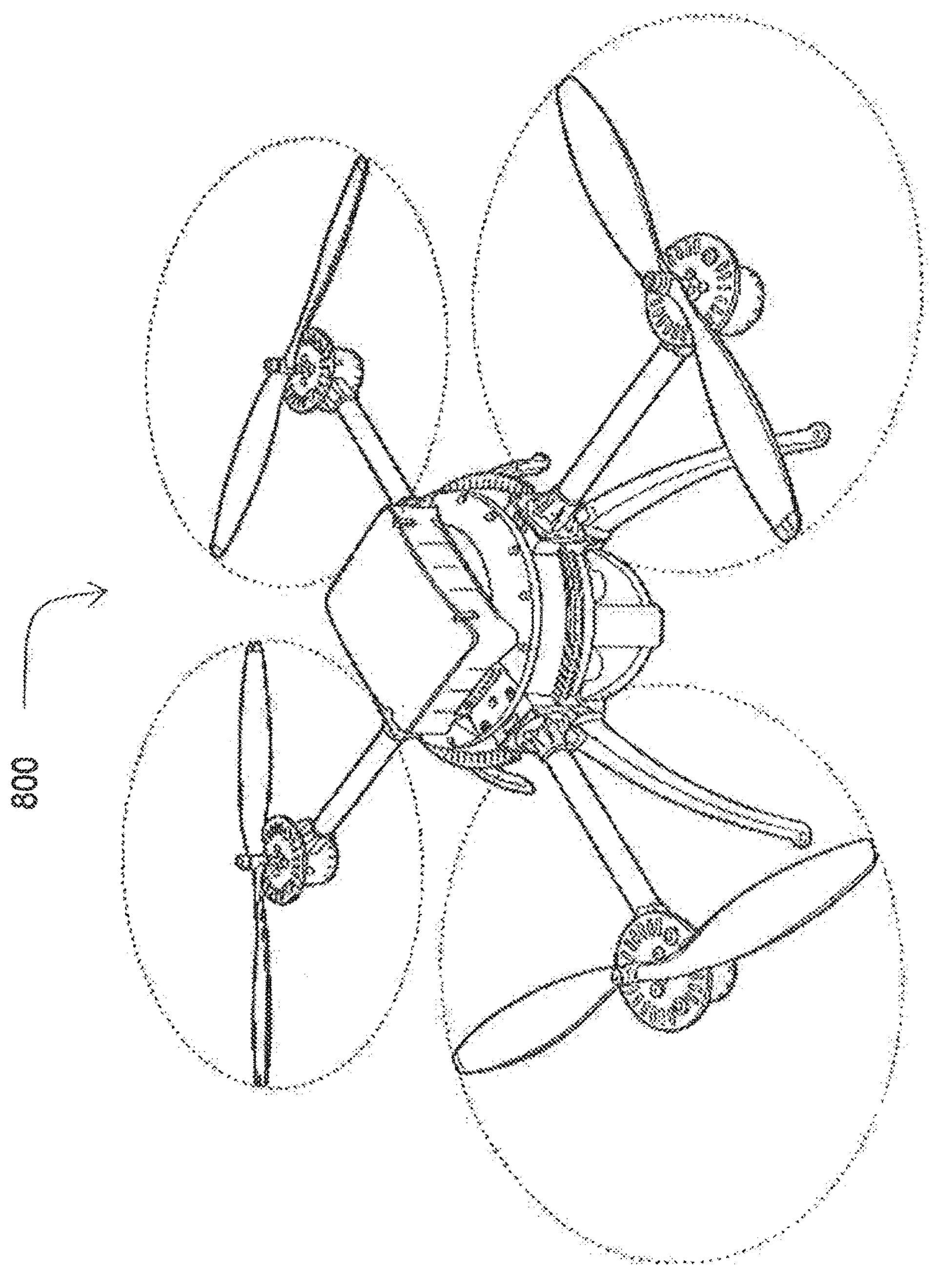
FIG. 13A is a front perspective view of a UAV.
Figure 13B:
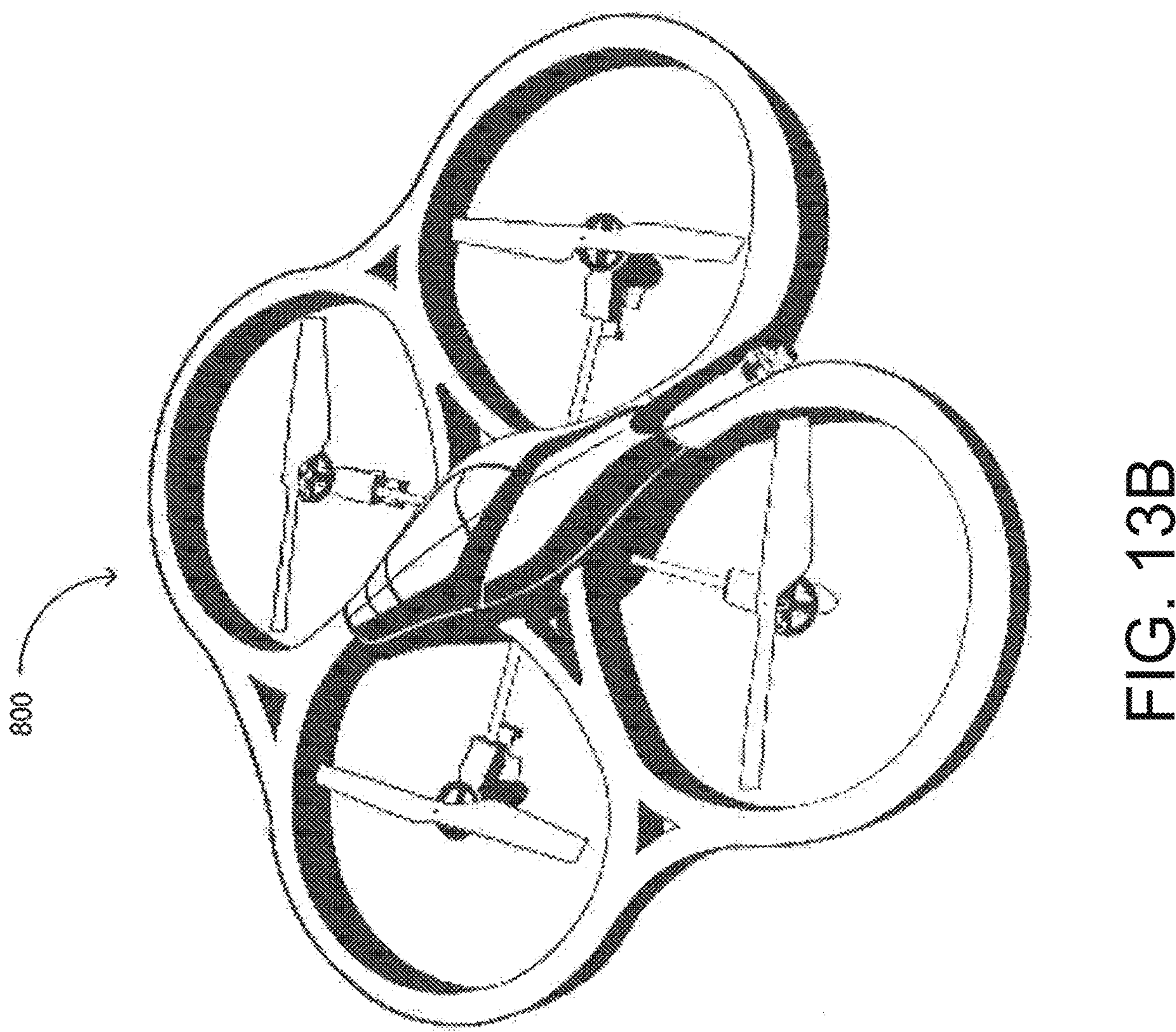
FIG. 13B is an additional perspective view of the apparatus coupled with a UAV.
Figure 13C:
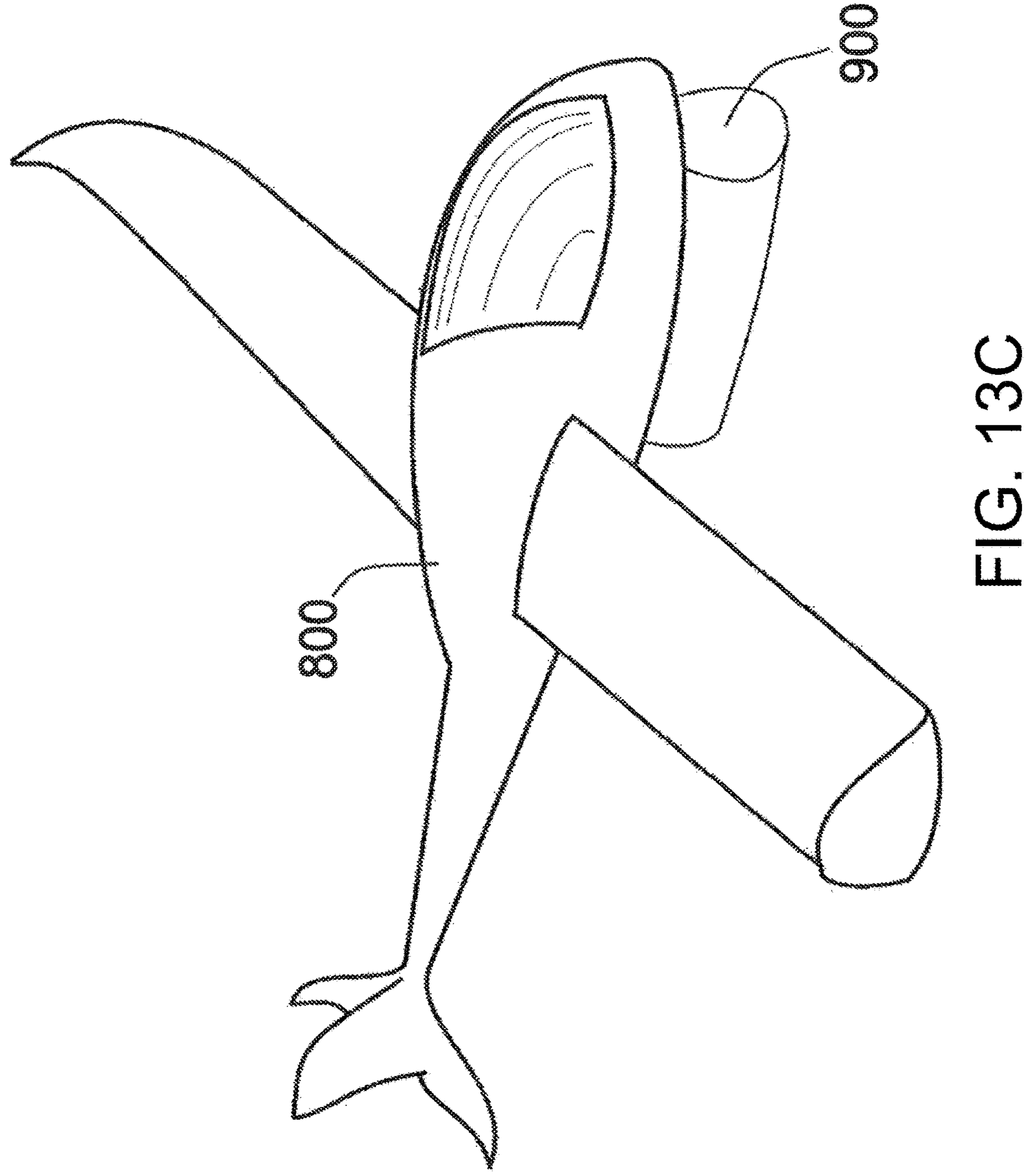
FIG. 13C is perspective view of the apparatus coupled with a fixed-wing UAV.
Figure 14:
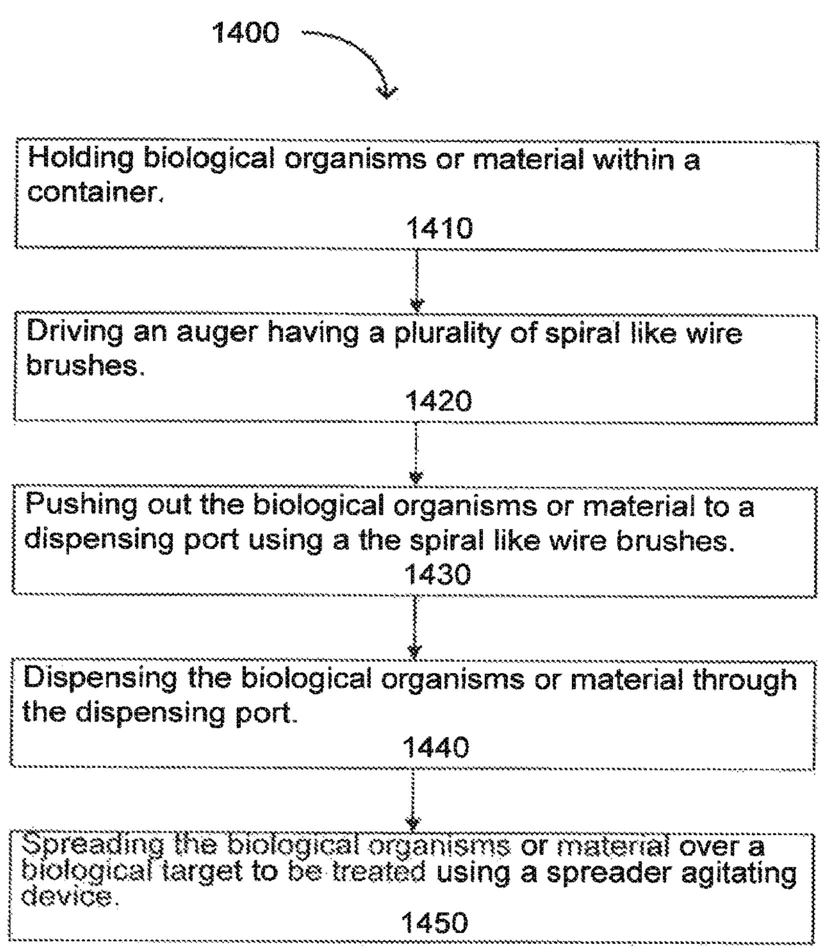
FIG. 14 represents an execution diagram for the method of biological controlling agricultural pests.

Referring still to FIGS. 3 and 3A, the auger motor mount 300 includes a first motor holding area 32 for securing and holding a first motor 38 (See FIG. 12A) that will beneficially drive an auger 400 mounted to said motor 38 (See FIGS. 4, 4A and 4B). Additionally, the auger 400 will be inserted through an auger insertion hole 32*a* and mounted to the first motor 38 by means of a shank hole 45 as illustrated in FIGS. 4 and 4A. Further, the auger 400 includes spurs 40 for connecting and securing spiral like wire brushes 47 as depicted in FIGS. 4C and 4D.

Figure 5:
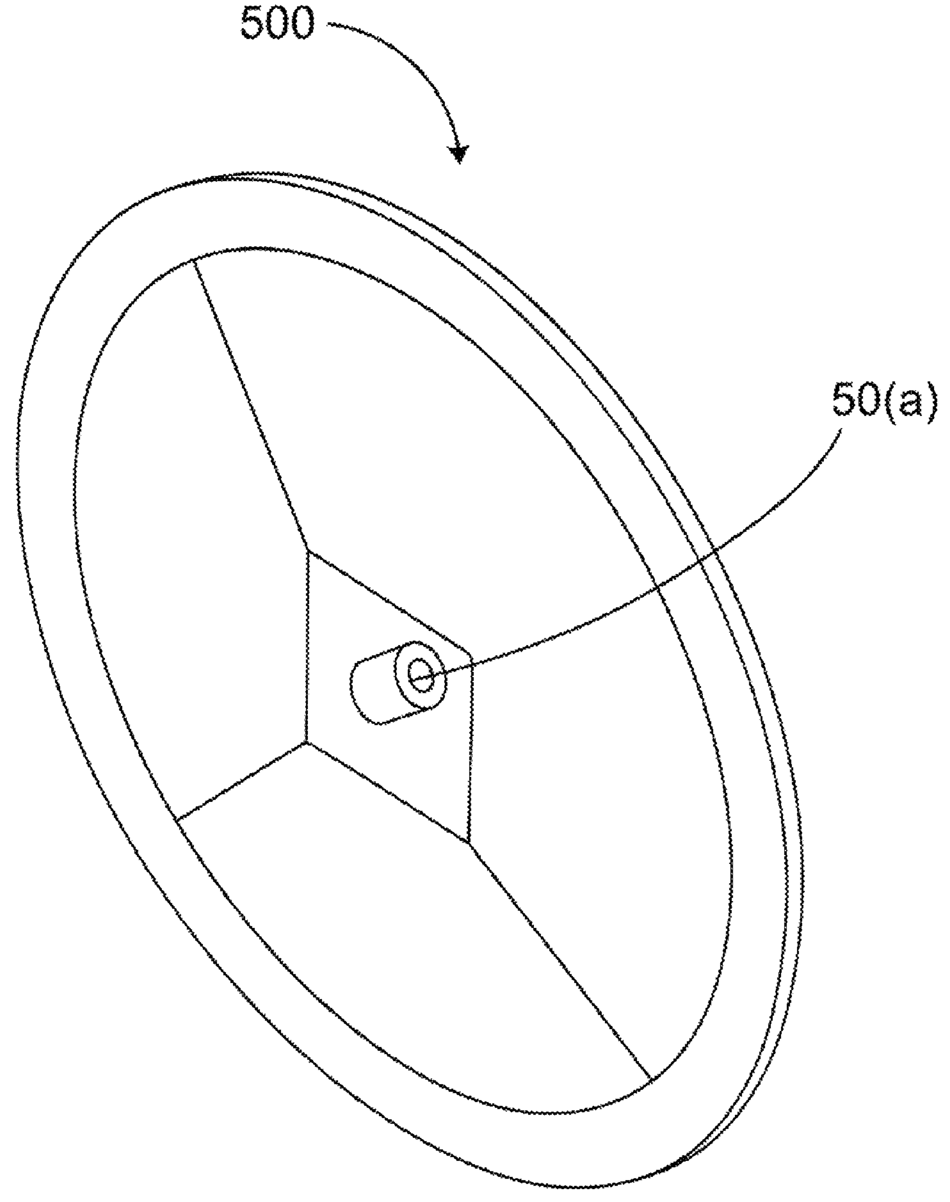
FIG. 5 is a front view of the spreader agitating device.
Figure 5A:
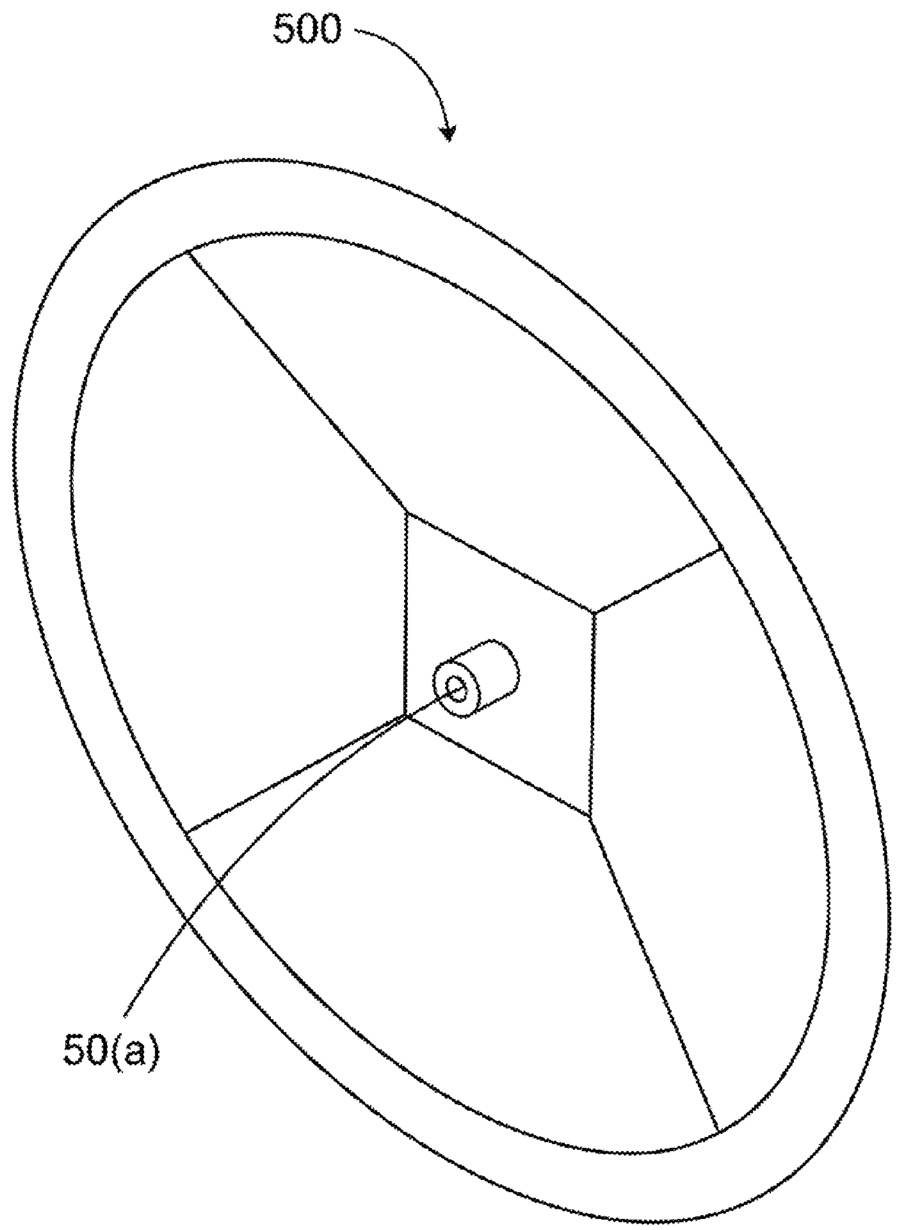
FIG. 5A is another front view of the spreader agitating device.
Figure 6:
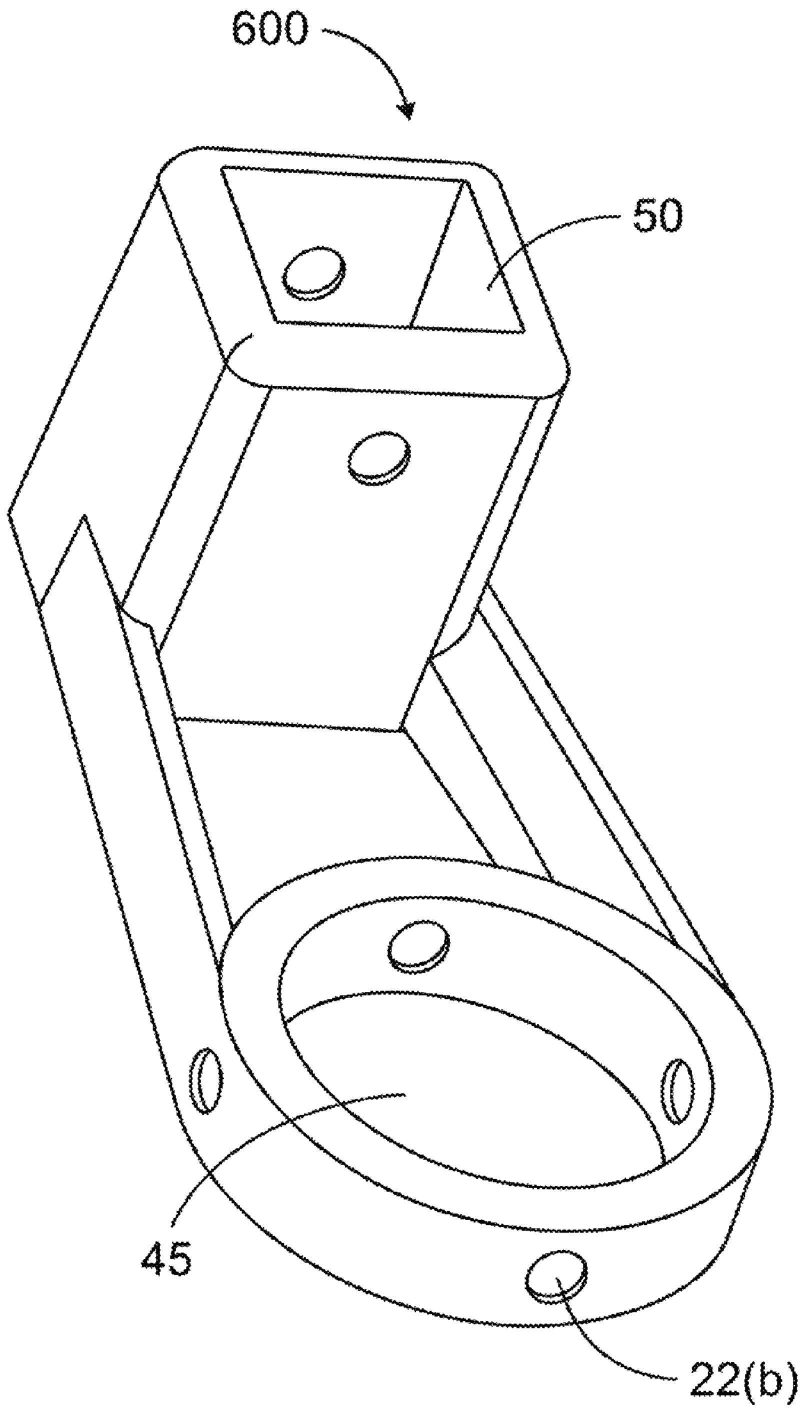
FIG. 6 is a front perspective view of the spreader motor mount.
Figure 6A:
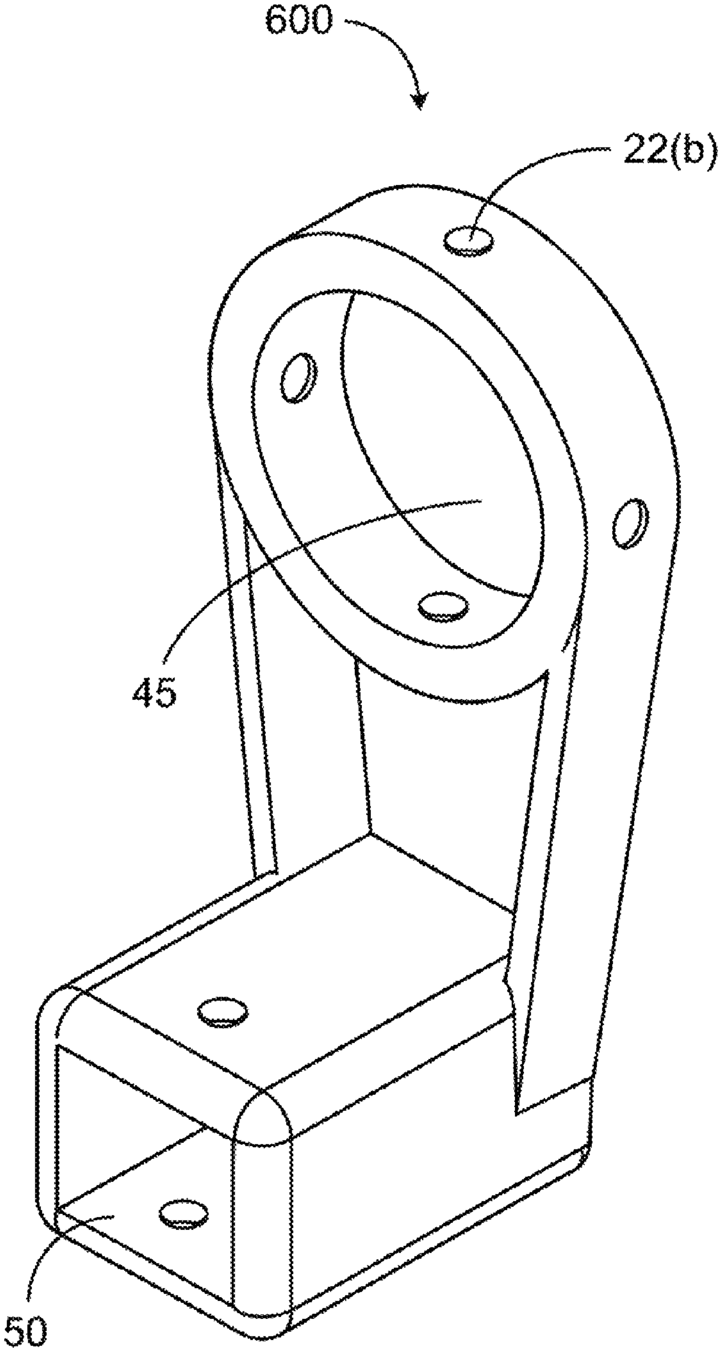
FIG. 6A is another front perspective view of the spreader motor mount.

Referring now to FIGS. 5 and 5A, a spreader agitating device 500 is shown. The spreader agitating device 500 is mounted to and driven by a second motor 53 (See FIG. 12) for spreading the essentially beneficial biological organisms 7 or materials 9 over the biological target to be treated. The second motor 53 is also secured and held in a second motor holding area 50 that is located on the spreader motor mount 600 as shown in FIGS. 6 and 6A.

In use, the spinner motor mount connection area 45 of the spreader mount 600 is securely mounted to the second end 20 of the hopper 200. In this configuration, the spreader agitating device 500 is connected to the second motor 53 by fastening the agitating connecter 50A to the second motor 53.

Figure 7:
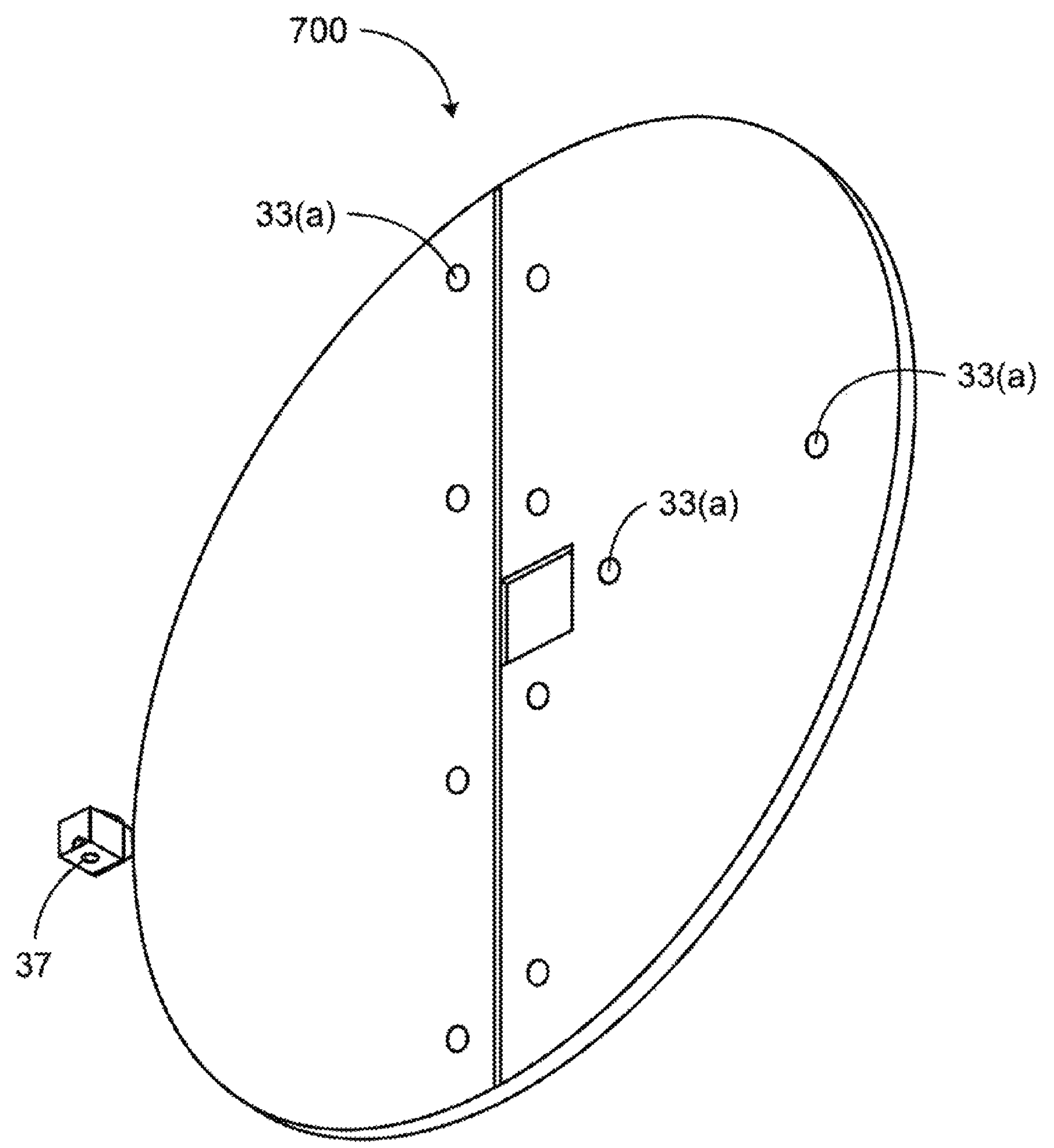
FIG. 7 is a front perspective view of the hopper lid.
Figure 7A:
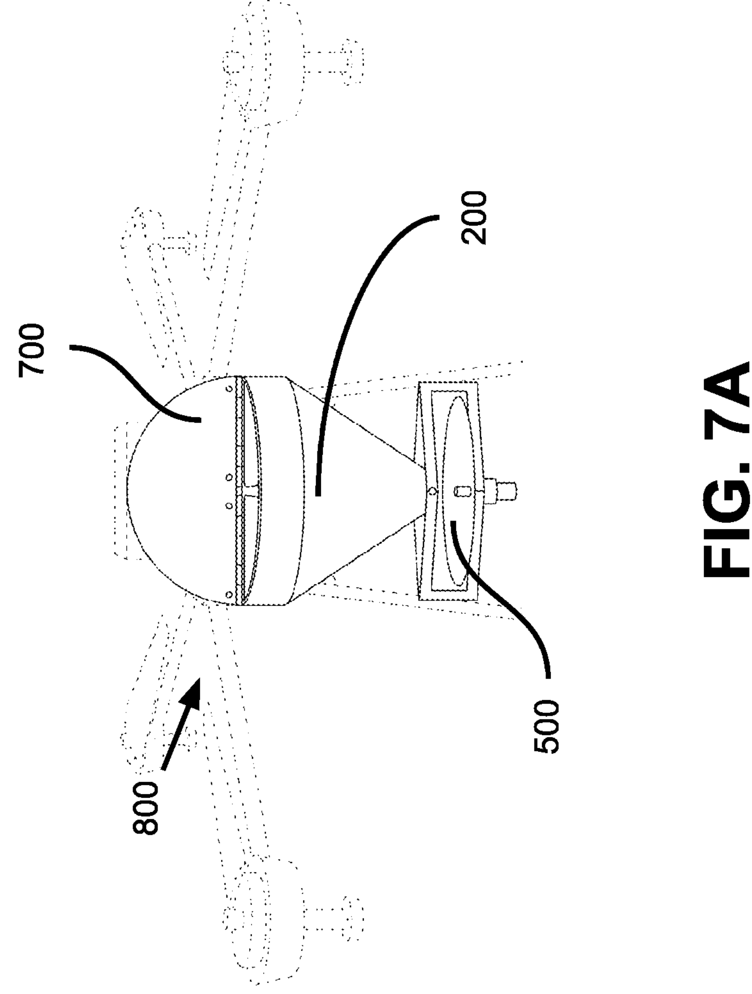
Figure 8:
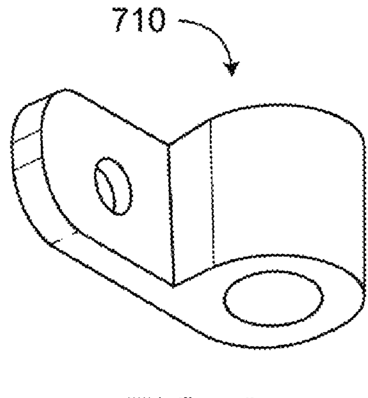
FIG. 8 is a front perspective view of the hinge for the hopper lid.
Figure 9:
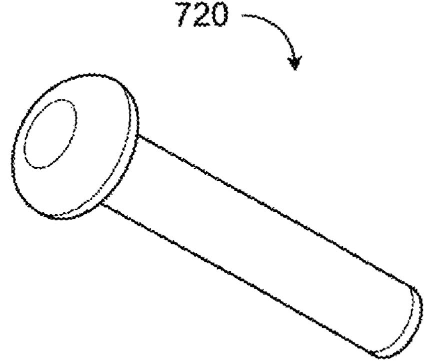
FIG. 9 is a front perspective view of the hinge pin for the hopper lid.
Figure 10:
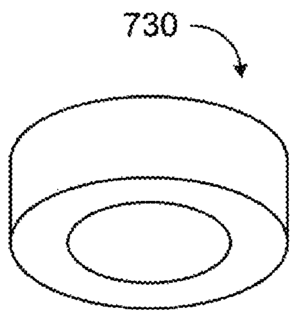
FIG. 10 is a front perspective view of the hinge pin cap for the hopper lid.
Figure 11:
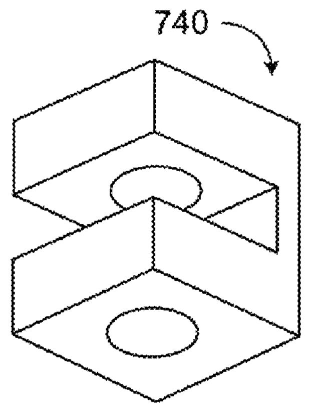
FIG. 11 is a front perspective view of the lid lock hinge.

Alternatively, one embodiment of the invention includes a lid 700 for securing the essentially beneficial biological organisms or materials within the hopper 200 (See FIG. 7). Another embodiment of the invention will include an optional lid 700 that opens on one end and remains closed on the other end (See FIG. 7A). To open the lid 700 on one end, the following components are needed: a hinge 710 (See FIG. 8), a hinge pin 720 (See FIG. 9) and a hinge pin cap 730 (See FIG. 10). Optionally, the hinge 710, hinge pin 720 and hinge pin cap 730 can be fastened to the screw insert slots 33*a* located on the opening end of the lid 700 for allowing one end of the lid to open and close as shown in FIG. 7A. A further option of the invention allows for a lid lock hinge 11 to be securely fastened to the top portion of the hopper 200 in order to allow the lid 700 to be securely sealed by a fastening mechanism 37 when in the closed position (See FIG. 7).

In operation, the apparatus 100 is securely mounted to an optional unmanned aerial vehicle (UAV) 800 (See FIGS. 1, 1A, 13A, 13B, and 13C) with essentially beneficial biological organisms 7 (also referred to as biological control agents) or materials 9 securely enclosed within the hopper 200. After the biological organisms such as predatory mites are secured in the hopper, the UAV will be flown over an agricultural crop (i.e., biological target) such as a strawberry field or a state legalized marijuana field and the apparatus 100 will then advantageously spread the essentially beneficial biological organisms 7 or materials 9 over the selected biological target.

Referring still to the apparatus 100 in operation, the essentially beneficial biological organisms 7 or materials 9 are released from the hopper 200 when the auger 400 is spinning and the spiral like wire brushes 47 advantageously push or agitate the essentially beneficial biological organisms out and through the dispenser port 30. After the essentially beneficial organisms or materials (e.g., predatory mites such as *persimilis* mites) have been released from the dispenser port 30, they are beneficially spread over the target location by the spreader agitating device 500 as it spins while the apparatus 100 is flying over the target. Optionally, the flight path of the apparatus 100 can be advantageously controlled by a global positioning system (GPS) in order to uniformly apply the essentially beneficial biological organisms on and/or over the selected targets to be treated.

Figure 15A:
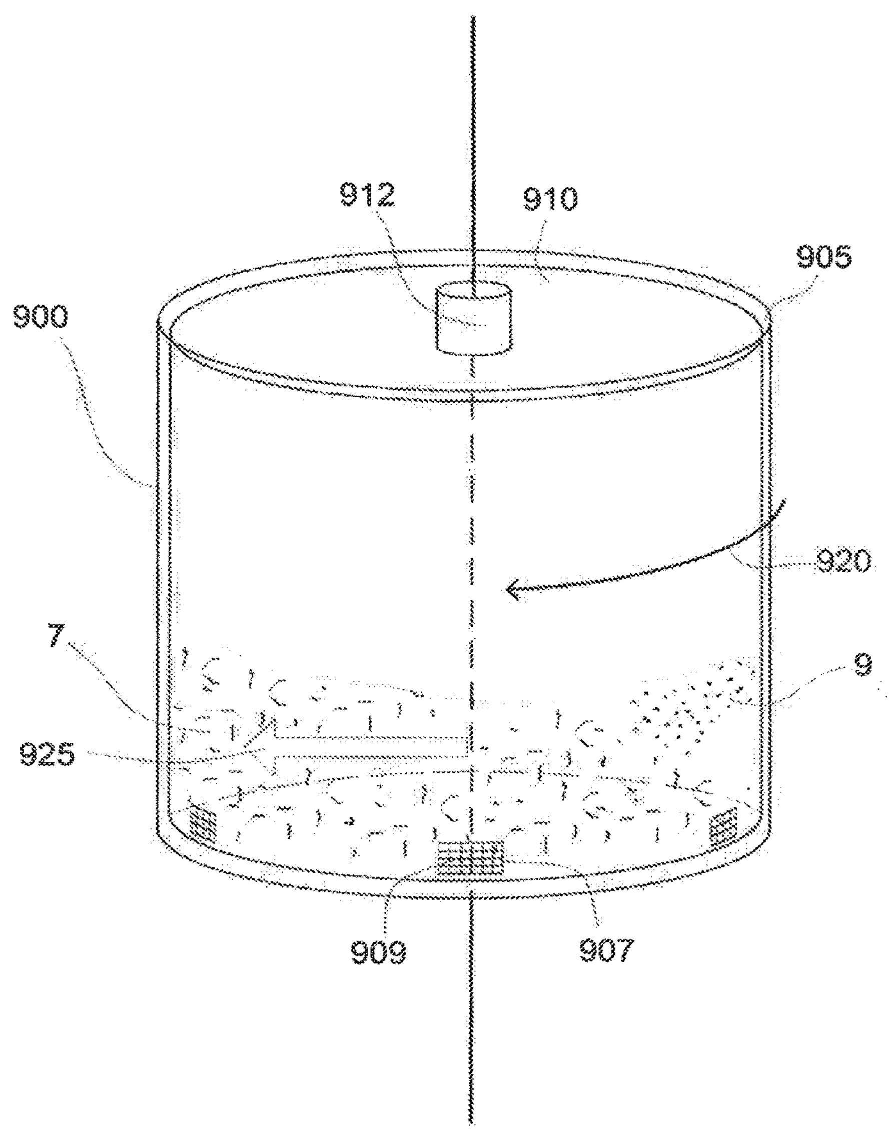
FIG. 15A is a perspective view of an embodiment having a drum for disseminating biological organisms or materials.
Figure 15B:
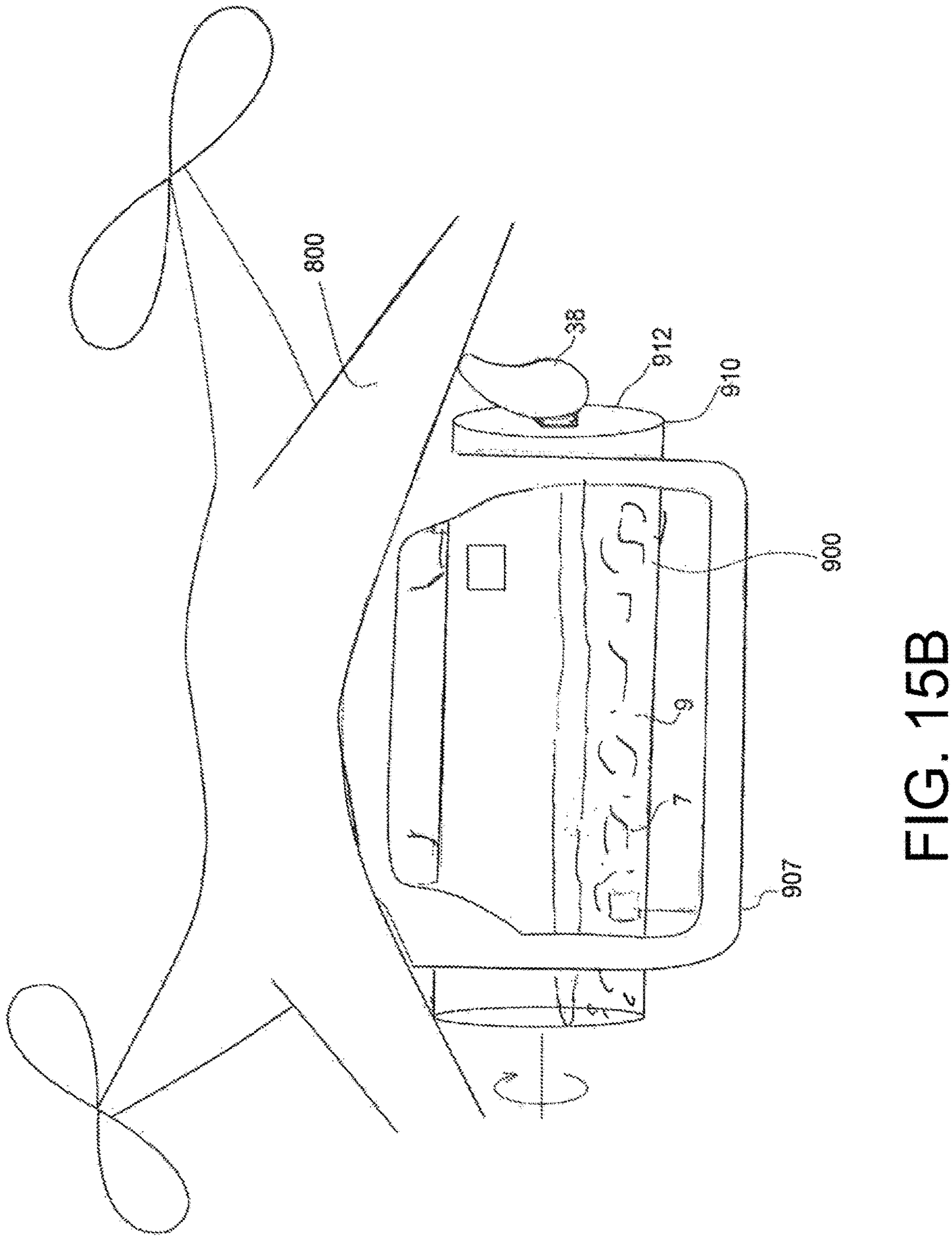
FIG. 15B is a perspective view of an embodiment having a horizontal drum for disseminating biological organisms or materials coupled with a multi copter drone.
Figure 16:
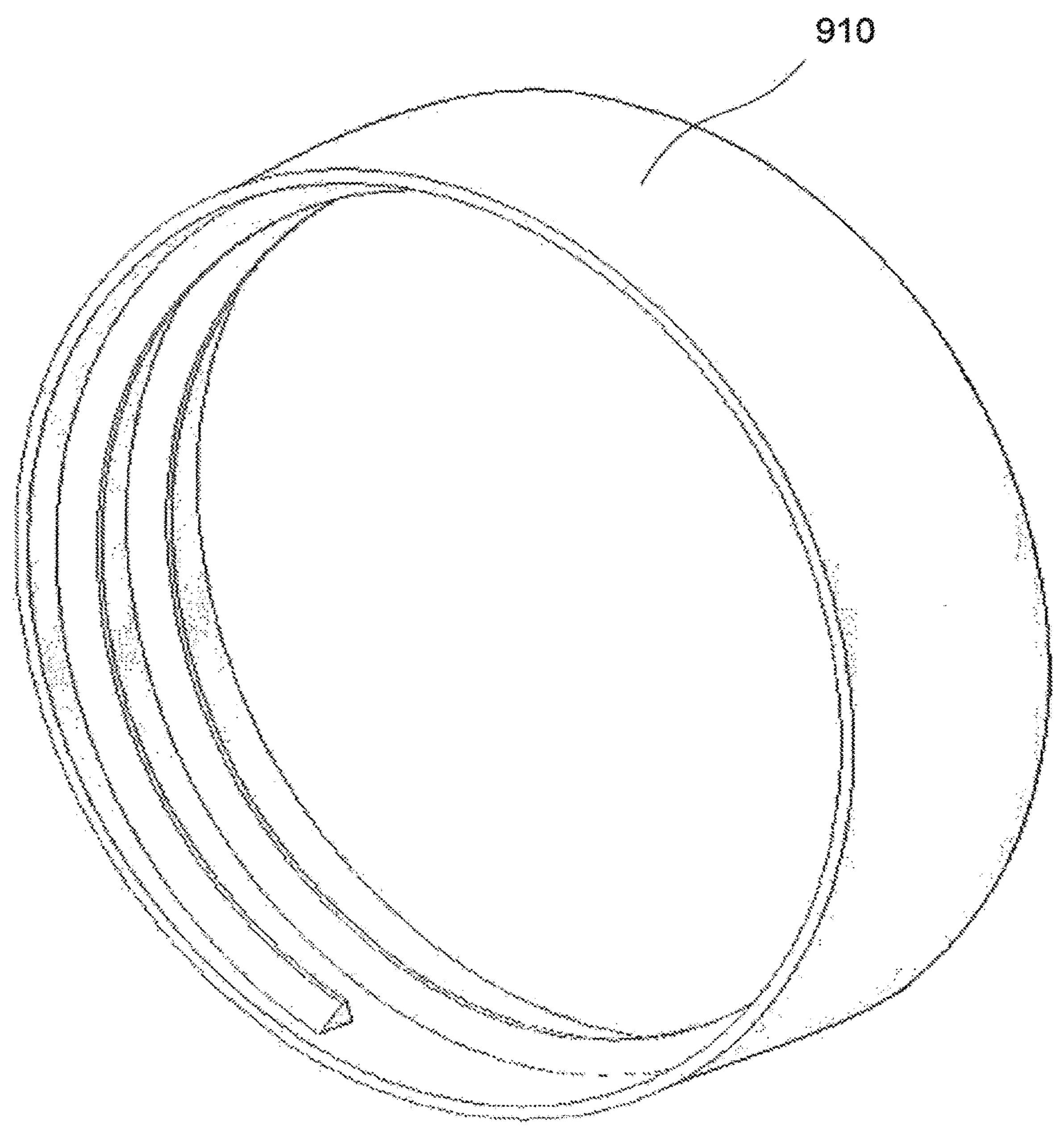
FIG. 16 is a front perspective view of a cap.

Turning now also to FIGS. 15A and 15B, in an alternative embodiment, dispersion components, including hopper 200, auger mount 300, auger 400, and spreader 500 are replaced with an alternative dispersion unit. Under this embodiment, the apparatus 100 includes drum 900. Drum 900 may comprise a hollow cylindrical container with an inner cavity 905 and defined by a circular base and an adjacent side wall. The side wall will optimally comprise a series of openings 907 sized such that essentially beneficial biological organisms 7 or materials 9 may freely pass through. Drum 900 may be mounted to an aerial vehicle, such as a UAV, or a manned or unmanned ground vehicle, such as a tractor or rover. Drum 900 may include a cap 910 for securing the essentially beneficial biological organisms 7 or materials 9 within the inner cavity 905 (See also FIG. 16). Cap 910 may also include a fastening means 914, such as clips or screws in order to secure cap 910 to the top of drum 900. Cap 910 may also include a motor holding area 912 which may couple with motor 38.

Figure 16A:
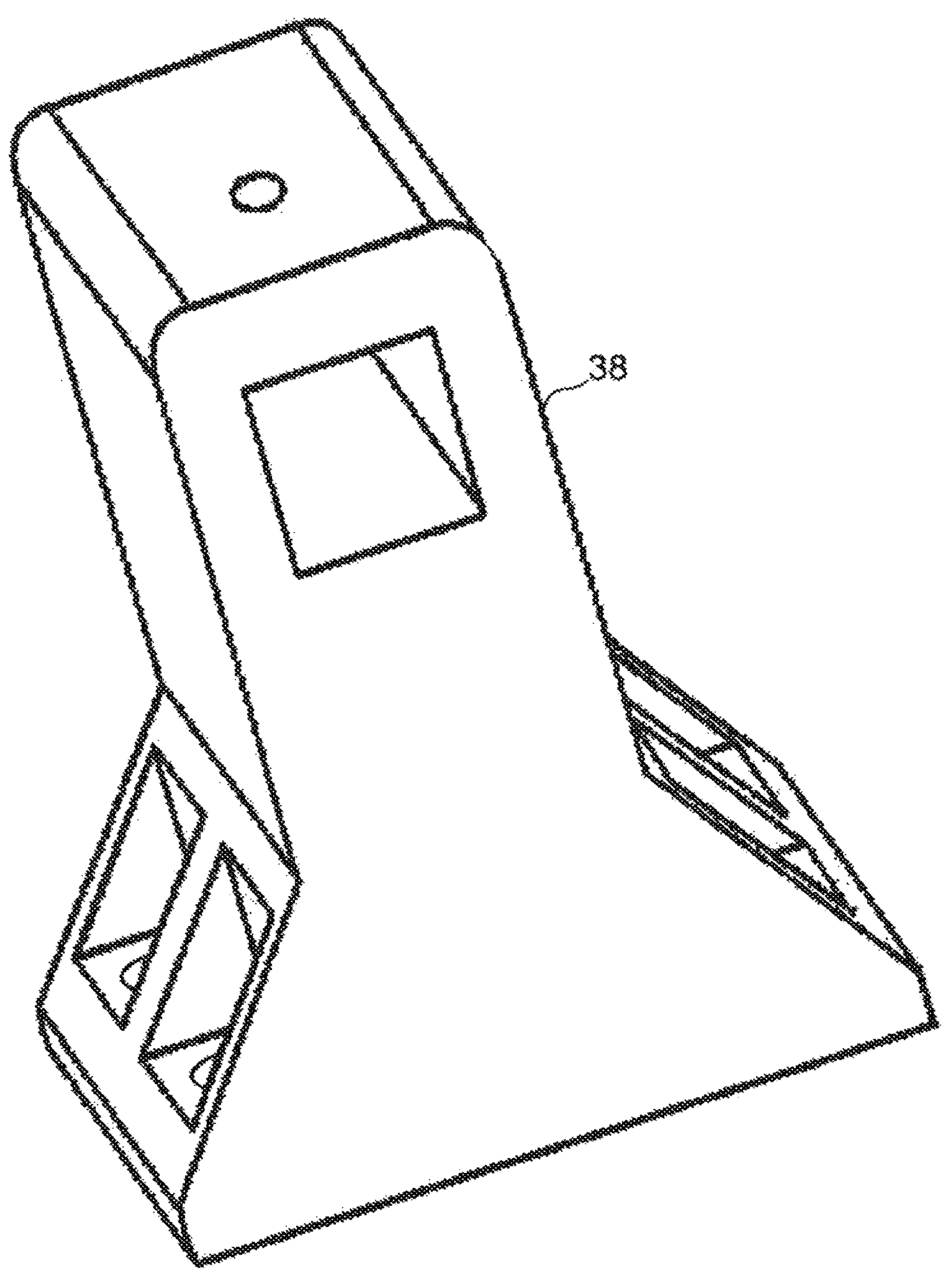
FIG. 16A is a front perspective view a motor housing mount.
Figure 16B:
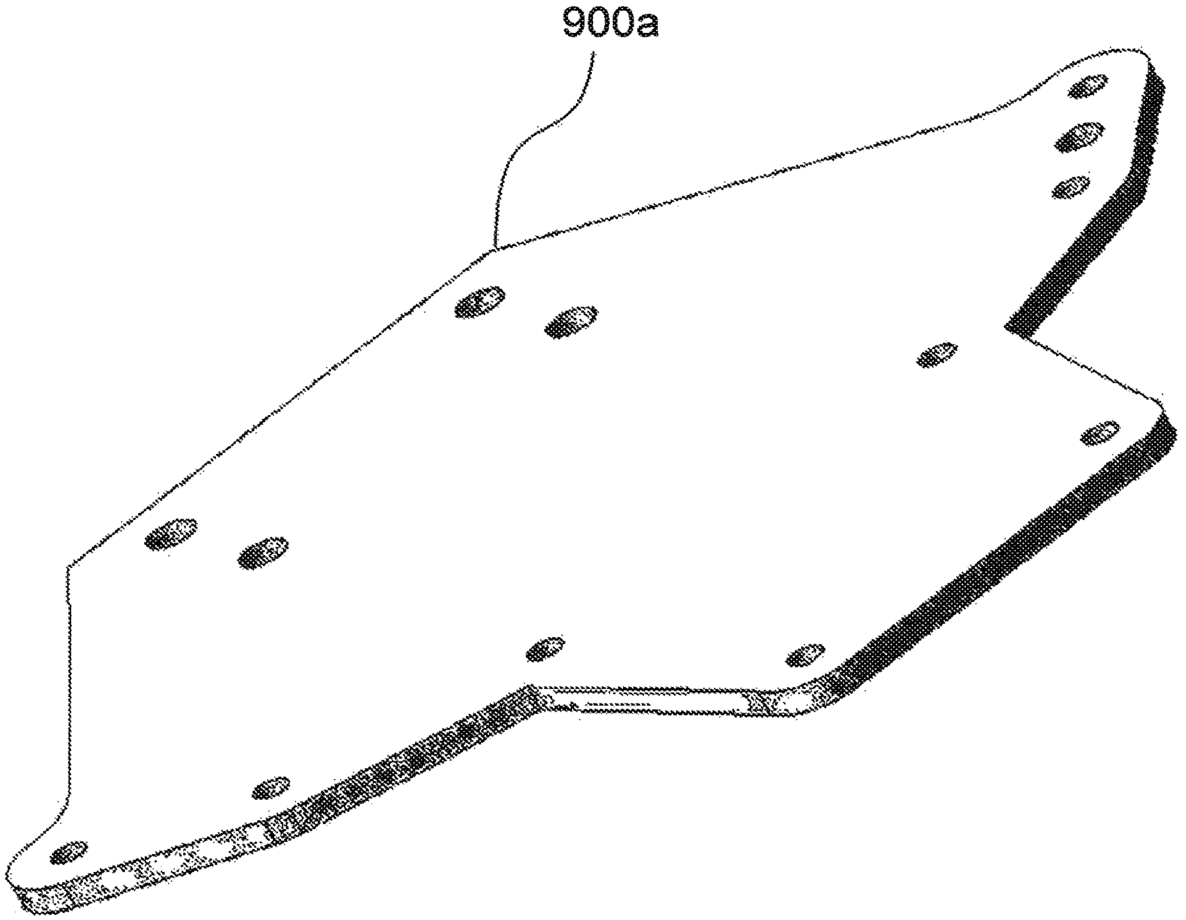
FIG. 16B is a perspective view of a drum platform.
Figure 16C:
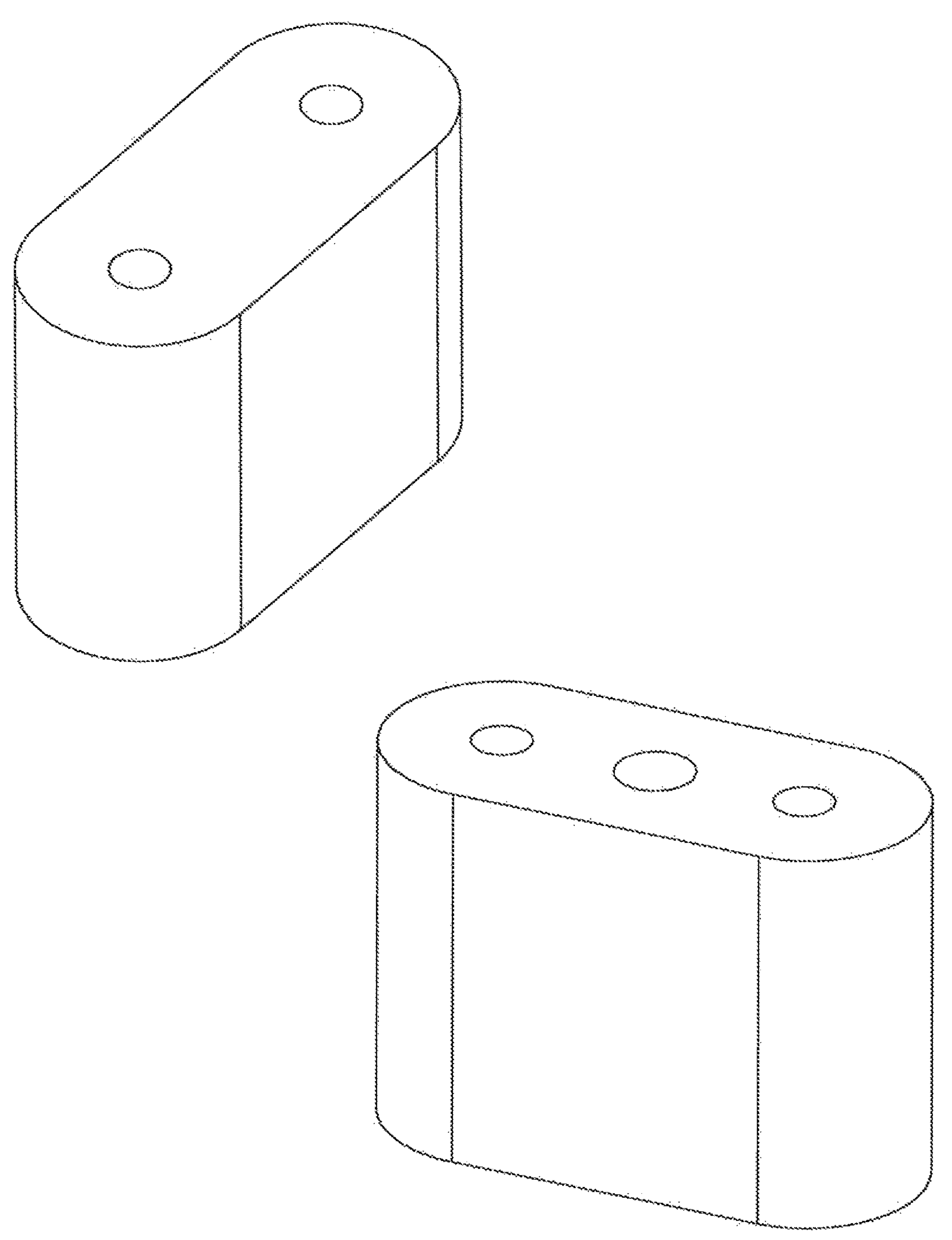
FIG. 16C is a perspective view of platform mounts.

Optionally, the motor 38 can be securely fastened or mounted to a motor housing mount 38*a* which is securely fastened or mounted to a drum platform 900*a* (See FIGS. 16A-16B). In one embodiment, the drum platform 900*a* is advantageously coupled to a plurality of platform mounts 900*b* which are securely fastened to the drone or the aerial device (See FIGS. 16B-16C).

In another embodiment, drum 900 is aligned such that the central axis of the drum is substantially vertical or perpendicular to the ground. During operation, motor 38 rotates 920 drum 900. As drum 900 rotates, the centrifugal force 925 of the rotation 920 urges essentially beneficial biological organisms 7 or materials 9 radially outwards in the inner cavity 905. The centrifugal force 925 should be applied to the extent that essentially beneficial biological organisms 7 or materials 9 are urged through the series of openings 907. Porous or mesh screens 909 may be applied to openings 907 so that essentially beneficial biological organisms 7 or materials 9 will not pass through openings 907 during non-operation but will allow the passage of essentially beneficial biological organisms 7 or materials 9 only when the centrifugal force 925 is applied.

In an alternative embodiment, cylindrical drum 900 is arranged horizontally, such that the central axis of the drum 900 is substantially parallel to the ground, as seen in FIG. 15B. In this embodiment, gravity will urge essentially beneficial biological organisms 7 or materials 9 to a bottom area of the side wall of the inner cavity 905. During operation, motor 38 will rotate 920 drum 900 about its central axis. As drum 900 rotates, essentially beneficial biological organisms 7 or materials 9 contained in the inner cavity 905 will continue to roll towards the bottom area of the side wall, exposing essentially beneficial biological organisms 7 or materials 9 to openings 907 as openings 907 pass by the underside of the drum 900 during rotation. As essentially beneficial biological organisms 7 or materials 9 passes over openings, essentially beneficial biological organisms 7 or materials 9 will be released from drum 900 onto the desired surfaces. On occasions, the essentially biological organisms 7 or materials 9 in the drum will arrange itself due to biological preferences. For example, some organisms will migrate to the top of the group of the essentially biological organisms 7 or materials 9 in order to get access to air or light, or in some instances naturally gravitate upwards. Accordingly, the rotation of drum 900 serves to mix the biological organisms 7 or materials 9 so that different materials are all evenly distributed for dispersion.

These embodiments have the advantage of dispersing biological organisms 7 or materials 9 through movement of the drum 900, rather than an auger in a drum or container. Granular materials such as the biological organisms 7 or materials 9, have a tendency to result in an equilibrium state where the grains are more resistant to movement, such as a jammed state. Accordingly, it is beneficial to apply a force to the granular materials to unjam them. Referring again to FIG. 15*b*, for example, as drum 900 rotates, gravity acting on the biological organisms 7 or material 9 causes the biological organisms 7 or materials 9 to experience a tumble-like motion. This motion acts to separate grains from each other and eliminate or minimize any jammed grains.

In further embodiments, illustrated in FIGS. 17-21, the dispersion unit comprises additional components for adjusting the size, shape, and/or number of openings. These embodiments give operators the ability to control the rate of dispersion of the biological organisms 7 or materials 9. Such control is desirable, since the optimal rate of dispersion is variable and depends, among other factors, on the type of crop, the size of the field, the type of organisms or materials to be dispersed, the speed and altitude of the vehicle, and environmental factors.

Figure 17:
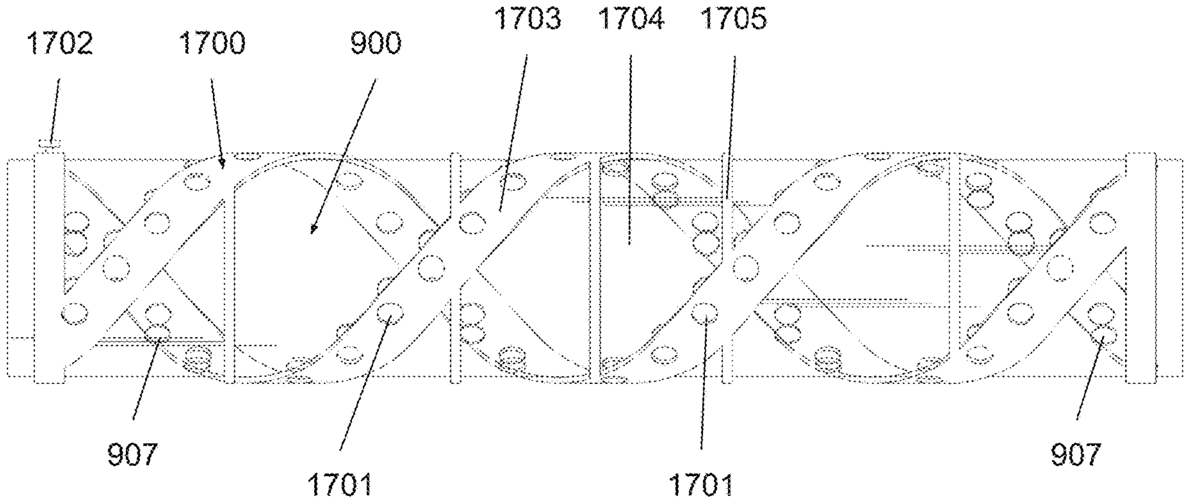
FIG. 17 front view of the dispersion unit drum and sleeve.

In various embodiments, dispersion control is achieved by means of a sleeve 1700 comprising a surface with a plurality of openings 1701 (see FIG. 17). The sleeve 1700 is arranged proximate to the surface of the drum 900, with its plurality of openings 907. For example, in various embodiments, the sleeve has a substantially cylindrical shape, configured to wrap around the cylindrical drum 900. The sleeve may thus be positioned such that its second plurality of openings 1701 overlap with the drum's first plurality of openings 907, forming gaps 1801, 1803 through which biological organisms 7 or materials 9 can pass (see FIGS. 18A and 18B). The sleeve 1700 may be positioned such that the sleeve openings 1701 are aligned 1801, unaligned 1802, or partially aligned 1803 with the drum openings 907. Adjusting this alignment modifies the size, shape, and/or number of gaps through which biological organisms 7 or materials 9 can pass.

The sleeve 1700 may be coupled to the dispersion unit drum 900 by means of a friction fit or may instead be coupled by means of a fixture element such as a screw 1702. In embodiments featuring a fixture element, a screw slide 1804 or similar element may be utilized to facilitate adjustment of the sleeve openings 1701 relative to the drum openings 907 (see FIGS. 18A and 18B). For example, in such embodiments, the sleeve 1700 may be rotated around the drum 900, within the path defined by the slide element 1804, when the fixture element 1702 is loosened, and the sleeve's position relative to the drum is fixed when the fixture element 1702 is tightened.

Particularly with respect to embodiments in which the dispersion unit is designed to be coupled to a UAV 800, it is desirable minimize the weight of the dispersion unit, including the dispersion control components. Reducing weight allows compatibility with a greater variety of vehicles and improves efficiency and maneuverability during flight. It is therefore desirable for the surface of the dispersion control sleeve to comprise the minimal surface area required to achieve the desired alignment 1801, non-alignment 1802, and/or partial alignment 1803 between the sleeve openings 1701 and drum openings 907. For example, the sleeve surface may comprise a spiral or helix shape 1703, configured to wrap around the dispersion drum, such that substantially the remainder of the drum surface 1704 is exposed.

Figure 18A:
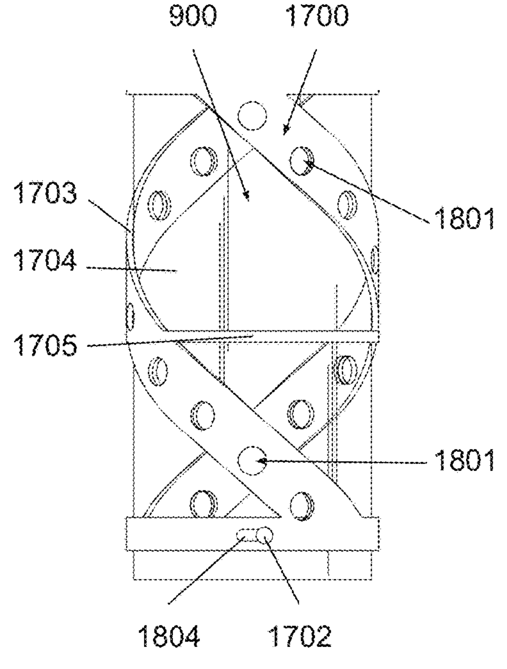
FIG. 18A is a partial top view of the dispersion unit container and sleeve, wherein the container openings and sleeve openings are substantially aligned.
Figure 18B:
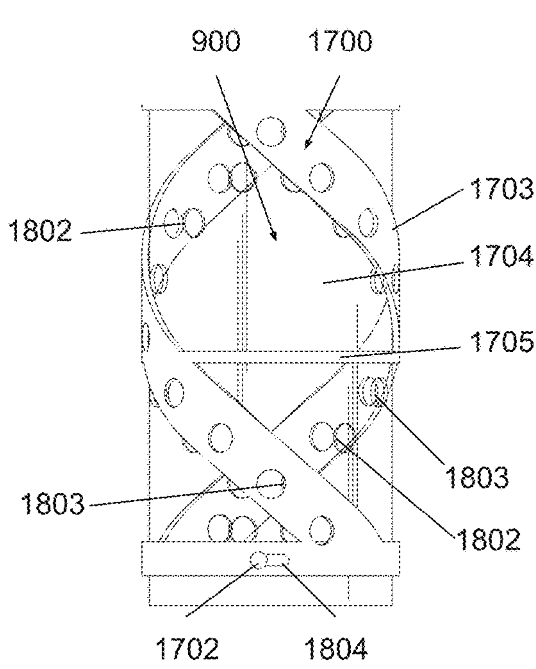
FIG. 18B is an additional partial top view of the dispersion unit drum and sleeve, wherein the container openings and sleeve openings are substantially unaligned.
Figure 19A:
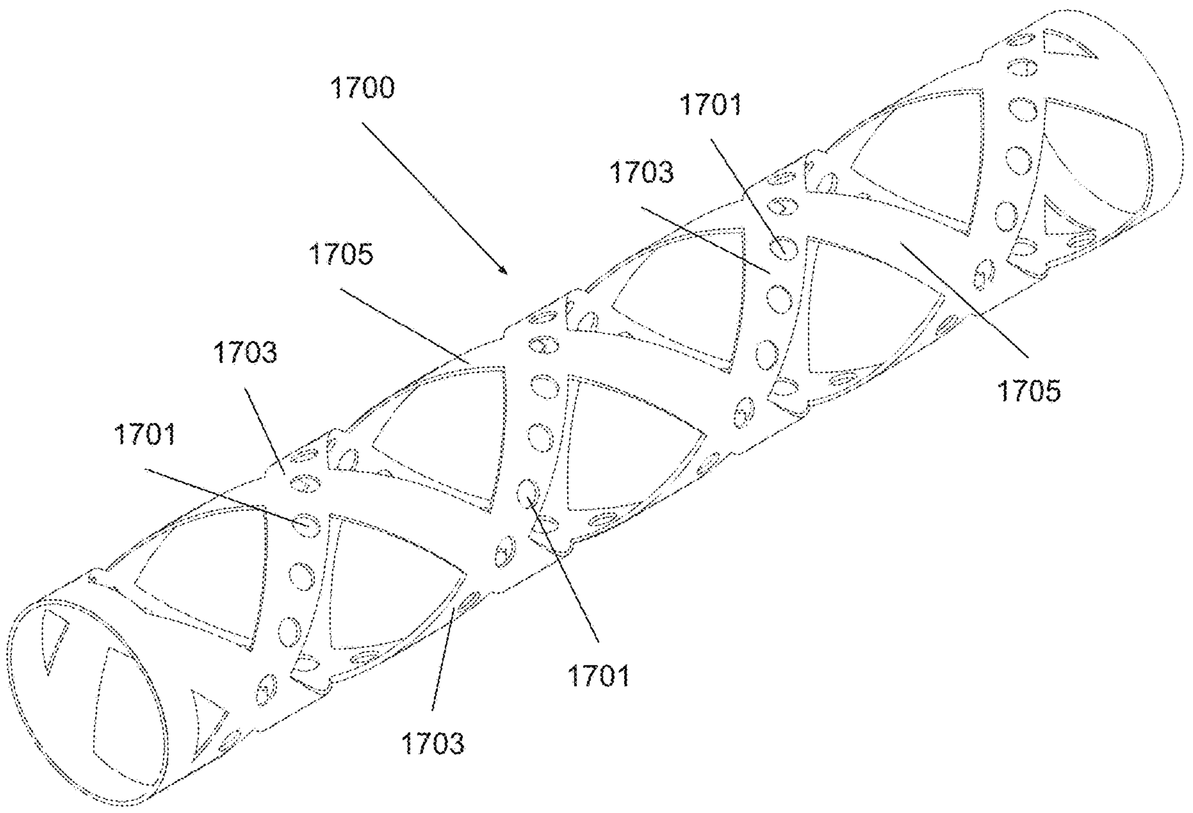
FIG. 19A is a perspective view of the dispersion unit sleeve.
Figure 19B:
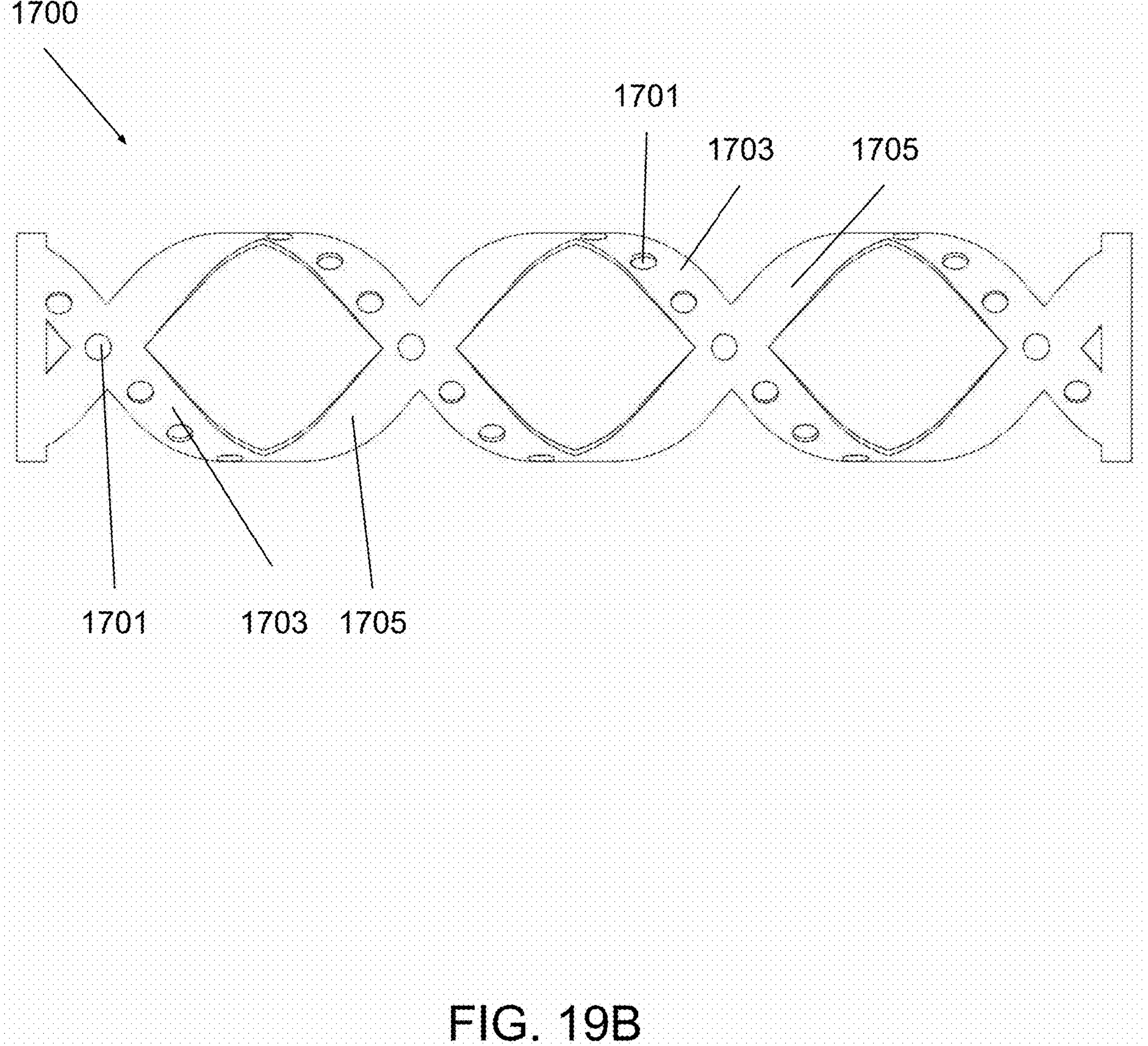
FIG. 19B is a front sectional view of the dispersion unit sleeve.

Reduction of weight and surface area, however, must be balanced against other desirable structural characteristics; in particular, the sleeve 1700 must be sufficiently strong and durable to withstand repeated flight and must be sufficiently rigid to resist malformation when rotated and/or when repositioned relative to the drum 900. To achieve greater strength, durability, and rigidity, the sleeve surface may be reinforced with support structure 1705. For example, as illustrated in FIGS. 17, 18A, and 18B, the support structure 1705 may comprise additional sleeve surface area forming narrow strips intersecting the sleeve's primary helical structure 1703 at oblique angles and arranged such that, when the sleeve is positioned around the drum, the length of the support structure 1705 is substantially perpendicular to the drum's cylindrical surface and substantially parallel to the drum's bases. FIGS. 19A, 19B, 20, and 21 illustrate an alternative embodiment of the support structure 1705, one which further increases sleeve rigidity. In this embodiment the support structure 1705 instead comprises a second helix shape, substantially inverse relative to the primary helical structure 1703 and intersecting the primary helical structure 1703.

The dispersion unit can be configured such that the drum 900 and sleeve 1700 rotate in unison, in which case the gaps 1801, 1803 formed by alignment of the sleeve openings 1701 and drum openings 907 remain constant during operation, unless the positioning of the sleeve is adjusted. Alternatively, the dispersion unit can be configured such that the sleeve 1700 remains in a fixed position while the drum 900 rotates, in which case alignment of the sleeve openings 1701 and drum openings 907 is dynamic during operation.

Figure 20:
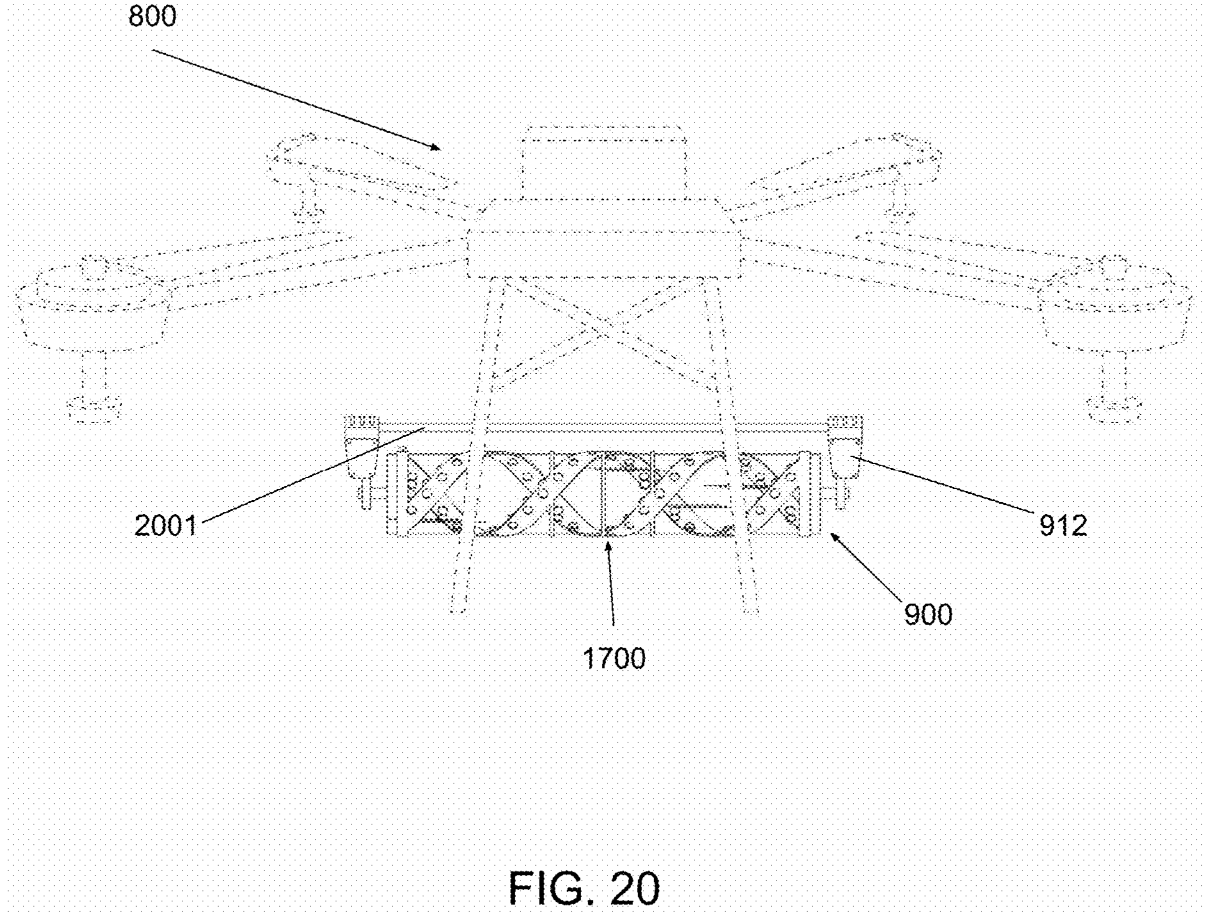
FIG. 20 is a front perspective view of an alternative embodiment of the apparatus coupled to a UAV.
Figure 21:
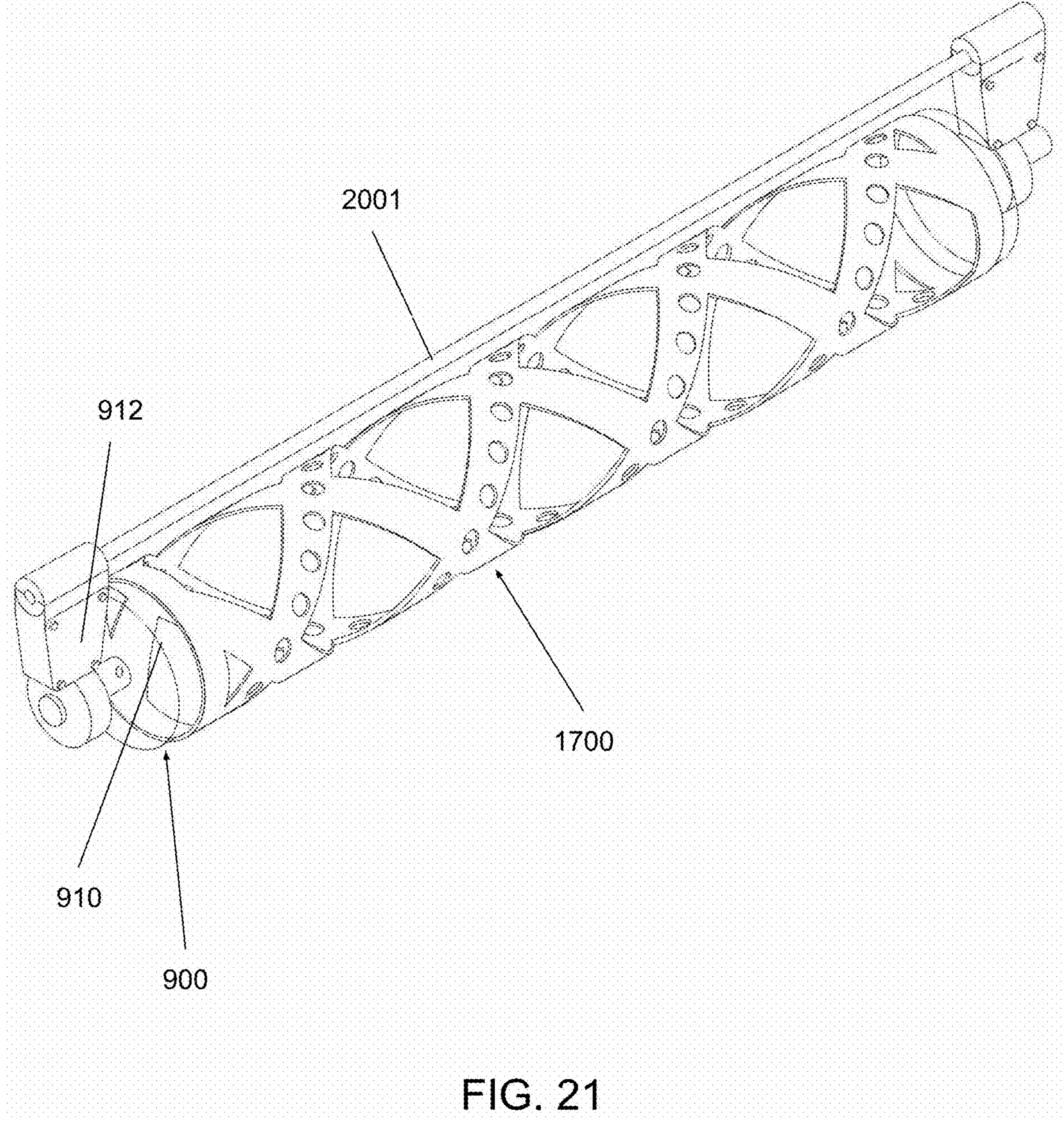
FIG. 21 is a perspective view of an alternative embodiment of the apparatus.

In various embodiments, dispersion drum 900 and sleeve 1700 may be coupled to an UAV 800 via a mounting strut 2001 (FIGS. 20 and 21). Strut 2001, drum 900, and sleeve 1700 may further be coupled to motor holding area 912, which houses the dispersion unit motor 38 that rotates drum 900.

In further embodiments, positioning of the dispersion control sleeve 1700 may be adjusted mechanically. For example, the dispersion unit may further comprise kinetic mechanisms configured to unlock, rotate, and re-lock the sleeve 1700 in response to electrical signals or other input. These mechanisms can be controlled remotely by a UAV operator, allowing dispersion rate to be modified mid-flight. Similarly, where the dispersion unit is coupled to a ground vehicle, the sleeve may be adjusted by a driver or remote operator. In alternative embodiments, sleeve positioning may be computer-controlled, such that adjustments are made automatically in response to data collected by sensors and/or other conditions, which conditions may be predetermined by the operator and/or determined dynamically by computer algorithms.

It is envisioned that in order to minimize a worker's need to interact with the biological organisms 7 or materials 9, hopper 200 or drum 900 may be unitized and sold as cartridges pre filled with the biological organisms 7 or materials 9. This allows for a standardized mixture of the biological organisms 7 or materials 9 to be used without individual workers needing to measure and mix organisms prior to each use. In such an embodiment, hopper 200 or drum 900, would be filled with a mixture of the biological organisms 7 and or materials 9, and the cap secured. A thin removable covering may then be applied to the exterior of the hopper 200 or drum 900 to cover the dispersing ports. Accordingly, the biological organisms 7 or materials 9 will be secure in the hopper 200 or drum 900 during transport or non-use. Once the device is to be used, the removable covering can be removed, and exposing the dispersing ports so the biological organisms 7 or materials 9 may be released to the target area.

In one embodiment of the invention, the device 100 can be used to spread predatory mites on or over strawberry fields in order to control and/or to eradicate spider mites (i.e., prey).

In an alternative embodiment of the invention, the device 100 can be used to apply and/or spread various types of other materials. These materials include, but are not limited to, the application of seeds, dry chemicals such as herbicides, pesticides, fungicides, dry fertilizers, and the application of agricultural amendments.

The term "prey" refers to mites that are present specifically as prey for the predatory mites to feed on. The predatory mites may feed on any life stage of the prey mite, for example eggs, juveniles or adults.

The term "predatory mites" refers to mites that are predators of any pest. In particular, it refers to mites that are predators of crop pests. They may be predators of pests such as insects, nematodes or arachnids. Typically, the predator mites will be useful for control of the common crop pests such as thrips, spider mites and whitefly. Most predatory mites belong to the family Phytoseiidae (order Acarina). The most common predators used for biological control are *Amblyseius swirskii, Phytoseiulus persimilis, Amblyseius califomicus, Amblyseius cucumeris, Amblyseius degenerans, Hypoaspis miles, Aphidoletes aphidimyza, Aphelinus abdominalis, Aphidius colemani, Chrysoperla carnea, Aphidius ervi*, and *Diglyphus isaea*, all of which may be used in conjunction with the present invention.

*Phytoseiulus persimilis* is advantageously used in biological control programs for two spotted spider mites (*Tetranychus urticae*), and related *Tetranychus* species. The mites are predators as nymphs and adults, mostly feeding on spider mite eggs and nymphs, but also consuming adults.

It will be preferable to choose a predator that will not cause damage to the crop plant itself The predator mites may be used to control pests on one or more of the crop plants in the following, non-exhaustive list: tomato, sweet pepper, chilli pepper, aubergine, cucumber, beans, squash, melon, strawberry, raspberry, banana, papaya, apple, pear, plum, grape, rose, chrysanthemum, gerbera, begonia, cyclamen, corn, poinsettia, citrus, skimmia, choiysia, daphne and magnolia. Further, the crop can be selected from the group consisting of peppers, cucumbers, aubergines, roses, gerberas, melons and beans.

According to a further embodiment of the invention, there is provided at least one predatory mite, and at least one prey mite to act as a food source for said predatory mite.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. An apparatus for biological control of agricultural pests comprising:

a rotatable container having an inner cavity and outer wall, the outer wall comprising a first plurality of openings, wherein biological organisms or biological materials within the inner cavity are released from the container through the first plurality of openings;

a motor connected to the container, wherein the motor rotates the container about its central axis and causes the outer wall to move; and a sleeve, arranged at least proximate to and surrounding the outer wall of the container, comprising a surface and a second plurality of openings, wherein the second plurality of openings is configured to be selectively aligned, unaligned, or partially aligned with the first plurality of openings to form gaps having a selected size and shape.

2. The apparatus of claim 1, wherein the sleeve is coupled to the container by a fixture element and wherein the container and sleeve are configured to rotate in unison.

3. The apparatus of claim 1, wherein the sleeve is configured to wrap around the container and wherein the sleeve surface comprises a helical shape.

4. The apparatus of claim 1, wherein the sleeve surface comprises a first helical shape and a second helical shape.

5. The apparatus of claim 1, wherein the biological organisms or biological materials have a size equal to or less than the first plurality of openings.

6. The apparatus of claim 5, further comprising one or more gaps formed by the at least partial alignment of the first plurality of openings and the second plurality of openings, wherein the one or more gaps are configured to allow the biological organisms or biological materials to pass out of the inner cavity through the gaps.

7. The apparatus of claim 1, further comprising one or more gaps formed by the at least partial alignment of the first plurality of openings, wherein the size and shape of the one or more gaps is variable when the container is rotated.

8. The apparatus of claim 1, further comprising a strut configured to be coupled to an unmanned aerial vehicle.

9. The apparatus of claim 1, further comprising a mechanism configured to move the sleeve relative to the container.

10. The apparatus of claim 9, wherein the mechanism is controlled by a computer.

11. A system for biological control of agricultural pests comprising:

a vehicle;

a container, coupled to the vehicle, having an inner cavity and outer wall, the outer wall comprising a first plurality of openings;

a motor connected to the container, wherein the motor rotates the container; and a sleeve arranged at least proximate to the outer wall of the container, comprising a surface and a second plurality of openings, wherein the second plurality of openings is configured to be selectively aligned, unaligned, or partially aligned with the first plurality of openings.

12. The system of claim 11, wherein the sleeve is configured to wrap around the container and wherein the sleeve surface comprises at least one helical shape.

13. The system of claim 11, further comprising:

at least one of biological organisms or biological materials within the inner cavity of the container, wherein the biological organisms or biological materials have a size equal to or less than the first plurality of openings; and one or more gaps formed by the at least partial alignment of the first plurality of openings and the second plurality of openings, wherein the one or more gaps are configured to allow the biological organisms or biological materials to pass out of the inner cavity through the gaps.

14. The system of claim 11, further comprising:

a mechanism configured to move the sleeve relative to the container during operation of the vehicle; and a user interface configured to allow the user to remotely control the mechanism.

15. The system of claim 11, further comprising a computer processor having instructions to control alignment of the first plurality of openings and the second plurality of openings.

16. A method for biological control of agricultural pests comprising the following steps:

storing at least one of biological organisms or biological materials within the inner cavity of the rotatable container of the apparatus of claim 1;

selecting a gap having a shape and size suitable to allow the biological organisms or biological materials to pass through the gap; and aligning the first plurality of openings and the second plurality of openings to form at least one gap having the selected shape and size.

17. The method of claim 16, further comprising the step of rotating the container to dispense the biological organisms or biological materials through the at least one gap.

18. The method of claim 17, wherein the step of selecting the shape and size of the gap is performed by a computer program.

* * * * *